(12) United States Patent
Bouchard et al.

(10) Patent No.: US 11,858,468 B2
(45) Date of Patent: Jan. 2, 2024

(54) LIFT-ASSISTED RACK FOR A VEHICLE

(71) Applicant: 9358-3433 QUÉBEC INC., Quebec (CA)

(72) Inventors: Mathieu Bouchard, Montreal (CA); Frederic Laurin-Lalonde, Quebec (CA); Damir Gacanovic, Montreal (CA); Joey Hebert, La Tuque (CA)

(73) Assignee: 9358-3433 QUEBEC INC., Quebec (CA)

( * ) Notice: Subject to any disclaimer, the term of this patent is extended or adjusted under 35 U.S.C. 154(b) by 489 days.

(21) Appl. No.: 17/059,777

(22) PCT Filed: May 31, 2019

(86) PCT No.: PCT/CA2019/050760
§ 371 (c)(1),
(2) Date: Nov. 30, 2020

(87) PCT Pub. No.: WO2019/227232
PCT Pub. Date: Dec. 5, 2019

(65) Prior Publication Data
US 2021/0300255 A1    Sep. 30, 2021

Related U.S. Application Data

(60) Provisional application No. 62/679,518, filed on Jun. 1, 2018.

(51) Int. Cl.
*B60R 9/042* (2006.01)
*B60P 3/10* (2006.01)
*B60R 9/048* (2006.01)

(52) U.S. Cl.
CPC .......... *B60R 9/0426* (2013.01); *B60P 3/1025* (2013.01); *B60R 9/048* (2013.01)

(58) Field of Classification Search
CPC ...... B60R 9/042; B60R 9/0423; B60R 9/0426
(Continued)

(56) References Cited

U.S. PATENT DOCUMENTS

| 5,284,282 A | * | 2/1994 | Mottino | ................. B60R 9/042 224/558 |
| 5,297,912 A | | 3/1994 | Levi | |

(Continued)

FOREIGN PATENT DOCUMENTS

| DE | 4330019 A1 | 3/1995 |
| DE | 4407510 A1 | 9/1995 |

(Continued)

OTHER PUBLICATIONS

Thule, Thule Hullavator Pro, retrieved at <https://www.thule.com/en-us/sport-rack/kayak-roof-racks/thule-hullavator-pro-_-1685448>, dated Apr. 16, 2018, 4 pages.

(Continued)

*Primary Examiner* — Scott T McNurlen
(74) *Attorney, Agent, or Firm* — Greensfelder, Hemker & Gale, P.C.; Richard C. Himelhoch

(57) ABSTRACT

A lift-assisted rack mountable to a roof of a vehicle and pivotable between a transport configuration and a loading configuration. The lift-assisted rack comprises: a fixed base mounted to the roof of the vehicle, a set of pivoting links, an article support, a pivoting arm and a lift-assisting strut. The set of pivoting links are pivotally connected to the fixed base at a link proximal end thereof. The article support is pivotally connected to the set of pivoting links, at a link distal end thereof. The pivoting arm is pivotally connected to the fixed base at an arm proximal end and is pivotable of a predetermined angular. The lift-assisting strut is pivotally connected to one link of the set of pivoting links at a strut distal end and (Continued)

is pivotally connected to the arm distal end of the pivoting arm, at a strut proximal end thereof.

22 Claims, 20 Drawing Sheets

(58) Field of Classification Search
  USPC .......................................................... 224/310
  See application file for complete search history.

(56) References Cited

U.S. PATENT DOCUMENTS

| | | |
|---|---|---|
| 5,360,150 A | 11/1994 | Praz |
| 5,398,778 A | 3/1995 | Sexton |
| 5,730,345 A | 3/1998 | Yeckley et al. |
| 5,827,036 A * | 10/1998 | Steffes .................. B60R 9/0426 224/310 |
| 6,000,593 A | 12/1999 | Chimenti |
| 6,149,039 A * | 11/2000 | Englander ............... B60R 9/042 224/310 |
| 6,427,889 B1 | 8/2002 | Levi |
| 6,561,396 B2 | 5/2003 | Ketterhagen |
| 6,634,529 B2 * | 10/2003 | Choiniere ................. B60R 9/10 224/310 |
| 6,764,268 B2 | 7/2004 | Levi |
| 7,048,490 B2 | 5/2006 | Henderson |
| 7,780,050 B2 | 8/2010 | Tucker |
| 8,398,136 B2 | 3/2013 | Miles |
| 9,415,726 B2 | 8/2016 | Levi |
| 9,630,565 B2 | 4/2017 | Gallagher |
| 9,815,413 B2 | 11/2017 | Rudnicki |
| 2002/0117523 A1 | 8/2002 | Ketterhagen |
| 2006/0175368 A1 | 8/2006 | Fallis, III et al. |
| 2006/0280583 A1 * | 12/2006 | Settelmayer ............ B60R 9/042 414/462 |
| 2007/0007316 A1 * | 1/2007 | Witczak .................. B60R 9/042 224/310 |
| 2017/0240118 A1 | 8/2017 | Lachance et al. |
| 2017/0341590 A1 | 11/2017 | McLauchlan |

FOREIGN PATENT DOCUMENTS

| | | |
|---|---|---|
| DE | 19900601 A1 | 7/2000 |
| WO | 0176913 A2 | 10/2001 |

OTHER PUBLICATIONS

Canadian Intellectual Property Office, International Search Report for International Application No. PCT/CA2019/050760, dated Aug. 20, 2019, 3 pages.
Canadian Intellectual Property Office, Written Opinion of the International Searching Authority for International Application No. PCT/CA2019/050760, dated Aug. 20, 2019, 3 pages.
European Patent Office, Extended European Search Report for EP 19812508.0, dated Jan. 4, 2022, 8 pages.

* cited by examiner

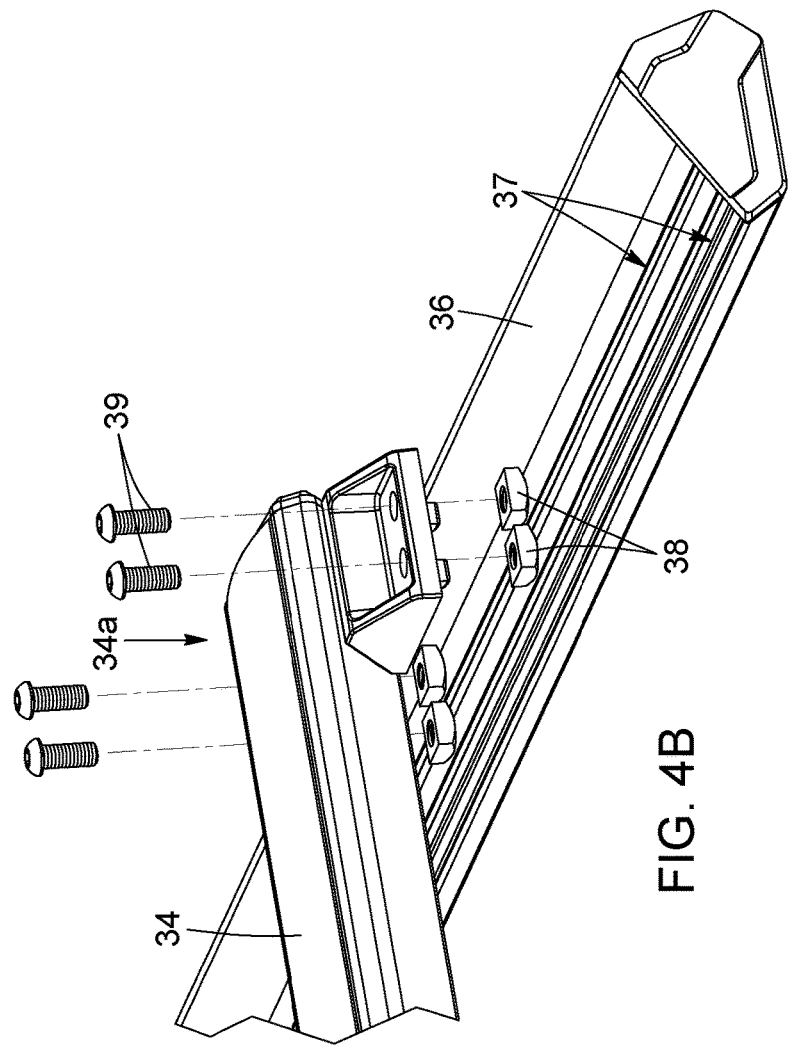
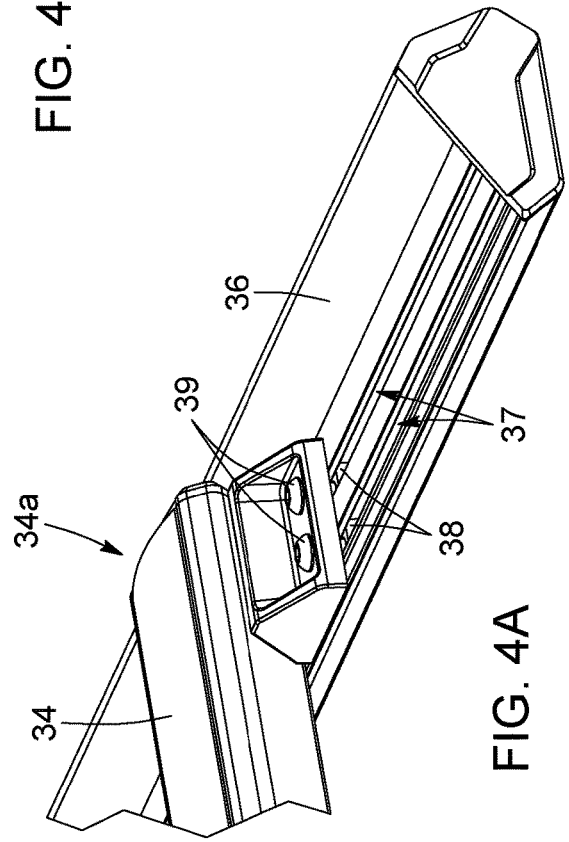
FIG. 4B
FIG. 4A

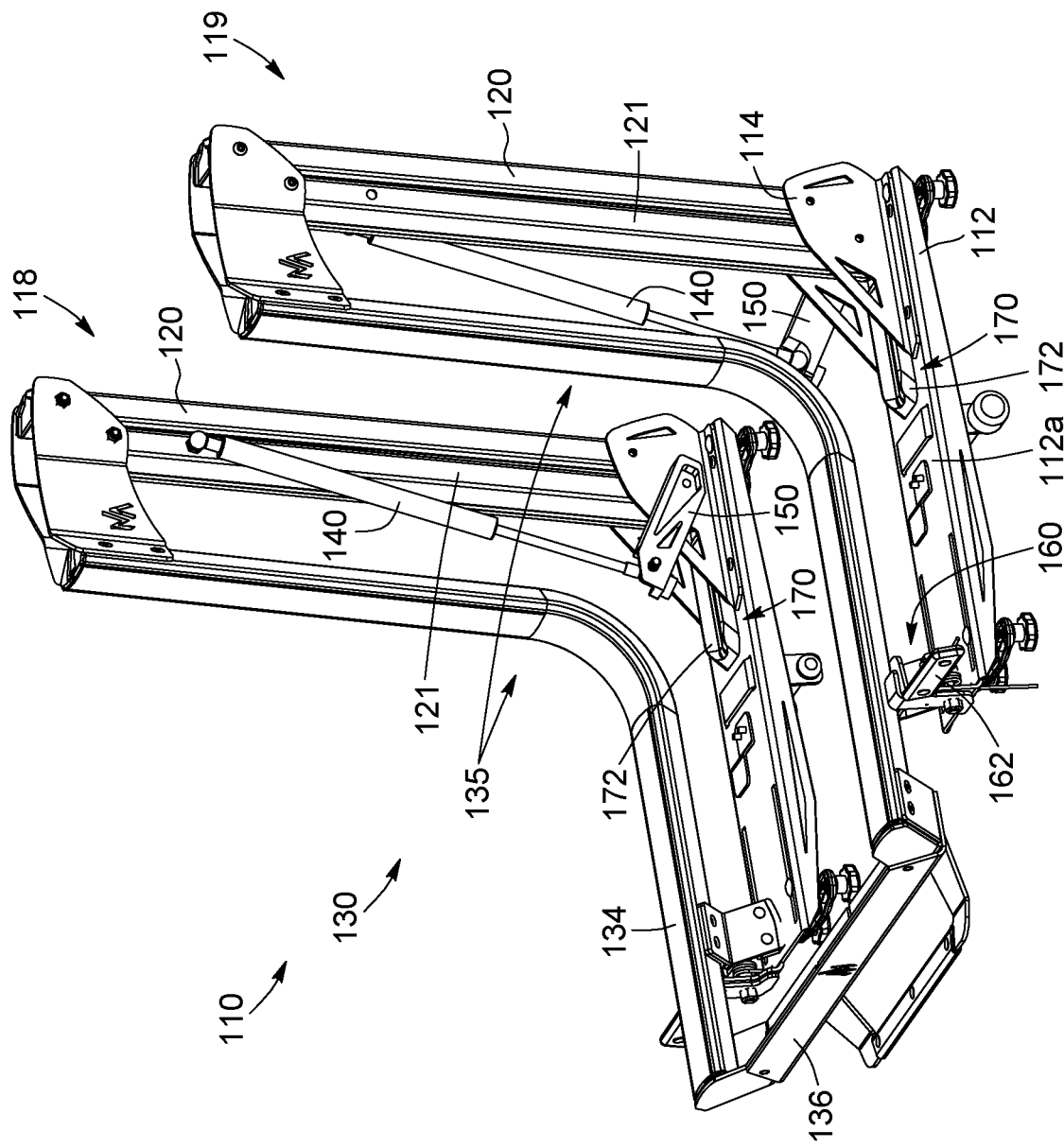

LIFT-ASSISTED RACK FOR A VEHICLE

CROSS-REFERENCE TO RELATED APPLICATIONS

This application is a U.S. national stage filing of International Application No. PCT/CA2019/050760 filed May 31, 2019, which claims priority under 35USC§ 119(e) of U.S. provisional patent application 62/679,518 filed Jun. 1, 2018, the specification of which hereby being incorporated by reference.

TECHNICAL FIELD OF THE INVENTION

The present invention relates to the field of racks for a roof of a vehicle. More particularly, it relates to a lift-assisted rack for carrying and supporting articles on a vehicle's roof. The lift-assisted rack is configured to be mountable to a roof rack of a vehicle and allows a smooth assisted transition between a transport configuration and a loading configuration (and vice-versa) for users to perform easy loading and unloading of the article thereon.

BACKGROUND

Many types of racks mountable to a roof of a vehicle are known in the art. Usually, such racks require users to lift articles, such as bikes, skis, watercrafts, etc., over the roof of the vehicle onto which the rack is installed, in order to load and secure the articles onto the rack. In some cases, racks are designed to allow pivoting of at least a portion thereof towards the ground, in order to momentarily lower the corresponding portion of the rack and therefore facilitate the loading and securement of an article onto the rack, by a user standing on the ground. Once the article has been loaded and secured onto the rack, the corresponding section of the rack can be pivoted back upwardly for subsequent transport of the article secured to the rack and positioned over the roof of the vehicle. Such racks are especially useful for securing large articles such as watercrafts (e.g. kayaks, canoes, etc.) or the like onto the rack for transport thereof.

Known racks which are mountable to the roof of a vehicle and have pivoting sections however tend to suffer from several drawbacks. Amongst others, known racks of this type are normally lift-assisted and require a considerable amount of force from the user, in order to perform the downward pivoting movement from a transport configuration to a loading configuration, when no article is loaded onto the rack. Indeed, additional power is normally required from the user for downwardly pivoting an empty rack between the transport configuration and the loading configuration (especially at the beginning of the movement) to overcome the resistance caused by the shock-absorbing mechanism normally provided to assist the user in pivoting the rack when the article is loaded thereon. In other words, known racks which are mountable to the roof of a vehicle and have pivoting sections, commonly include a shock-absorbing mechanism designed to provide lift assistance and offer a resistance and slow the downward movement of the loaded rack, during the downward pivoting movement thereof (and at the same time assist the user in the subsequent upward pivoting movement of the rack when loaded), but result in inconvenient supplemental force being required from the user, when operating the rack without articles loaded thereon.

In view of the above, there is a need for an improved lift-assisted rack for a vehicle which, by virtue of its design and components, would be able to overcome or at least minimize some of the above-discussed prior art concerns.

SUMMARY OF THE INVENTION

In accordance with a first general aspect, there is provided a lift-assisted rack mountable to a roof rack of a vehicle and pivotable between a transport configuration and a loading configuration. The lift-assisted rack comprises: at least one base section having an engagement surface and being securable to a section of the roof rack of the vehicle; at least one pivoting link pivotable relative to a corresponding one of the at least one base section and extending between a link proximal end and a link distal end, the at least one pivoting link being pivotally connected to the corresponding one of the at least one base section at the link proximal end, to pivot about a static pivot point relative to the corresponding one of the at least one base section during pivoting of the at least one pivoting link; an article support pivotally connected to the at least one pivoting link, at the link distal end thereof; at least one pivoting arm pivotable relative to a corresponding one of the at least one base section and extending between an arm proximal end and an arm distal end, the at least one pivoting arm being operatively connected to the corresponding one of the at least one base section at the arm proximal end and being pivotable of a predetermined angular distance; and at least one lift-assisting strut extending between a strut proximal end and a strut distal end, each one of the at least one lift-assisting strut being pivotally connected to a corresponding one of the at least one pivoting links at the strut distal end and being pivotally connected to the arm distal end of a corresponding one of the at least one pivoting arm, at the strut proximal end.

In an embodiment, the at least one pivoting link comprises at least one set of pivoting links pivotable relative to the corresponding one of the at least one base section and extending between the link proximal end and the link distal end, each one of the pivoting links being pivotally connected to the corresponding one of the at least one base section at the link proximal end to pivot about a respective static pivot point relative to the corresponding one of the at least one base section during pivoting of the at least one set of pivoting links.

In an embodiment, the at least one pivoting arm is engageable to the engagement surface of the corresponding one of the at least one base section upon a predetermined angular displacement corresponding to the angular distance of which the at least one pivoting arm is pivotable.

In an embodiment, the predetermined angular distance of which the at least one pivoting arm is pivotable ranges between 90 degrees and 25 degrees.

In an embodiment, the predetermined angular distance of which the at least one pivoting arm is pivotable ranges between 55 degrees and 35 degrees.

In an embodiment, the article support comprises at least one substantially horizontal section.

In an embodiment, the at least one pivoting link and the article support are configured to maintain the at least one substantially horizontal section of the article support in a substantially horizontal orientation during the transition between the transport configuration and the loading configuration.

In an embodiment, the article support comprises at least two substantially horizontal section spaced apart from one another and the handle is adjustably securable to an outer end of the at least two substantially horizontal sections.

In an embodiment, the lift-assisted rack further comprising a final phase movement dampener configured to provide further resistance to the pivoting of the at least one pivoting link, during a final phase of an angular movement of the at least one pivoting link, where the lift-assisted rack is proximate to the loading configuration.

In an embodiment, the final phase of the angular movement of the at least one pivoting link comprises an angular displacement of the at least one pivoting link ranging between the last 60 degrees before the lift-assisted rack reaches the loading configuration and the last 20 degrees before the lift-assisted rack reaches the loading configuration.

In an embodiment, the final phase movement dampener comprises at least one linear damper having an end mounted to a corresponding one of the at least one pivoting link.

In an embodiment, the final phase movement dampener comprises at least one dampening pad lining a section of a corresponding one of the at least one base section and being positioned directly adjacent to a corresponding one of the at least one pivoting link, at the link proximal end thereof.

In an embodiment, each one of the at least one base section comprises a fixed anchor fixedly mounted thereto, the link proximal end of a corresponding one of the at least one pivoting link being pivotally connected to the fixed anchor.

In an embodiment, the arm proximal end of each one of the at least one pivoting arm is pivotally connected to the fixed anchor of a corresponding one of the at least one base section.

In an embodiment, the lift-assisted rack further comprises a locking mechanism having at least one locking lever movable between a locked position where the lift-assisted rack is locked in the transport configuration and an unlocked position where the lift-assisted rack is pivotable towards the loading configuration.

In accordance with another general aspect, there is provided a lift-assisted rack mountable to a roof of a vehicle and pivotable between a transport configuration and a loading configuration. The lift-assisted rack comprises: a fixed base mountable to the roof of the vehicle; a set of pivoting links extending between a link proximal end and a link distal end, the set of pivoting links being pivotally connected to the fixed base at the link proximal end thereof; an article support pivotally connected to the set of pivoting links, at the link distal end thereof; a pivoting arm extending between an arm proximal end and an arm distal end, the pivoting arm being pivotally connected to the fixed base at the arm proximal end and being pivotable of a predetermined angular distance; a lift-assisting strut extending between a strut proximal end and a strut distal end, the lift-assisting strut being pivotally connected to one link of the set of pivoting links at the strut distal end and being pivotally connected to the arm distal end of the pivoting arm, at the strut proximal end thereof.

In an embodiment, the fixed base comprises an elongated base section having an engagement surface and being securable to a section of a roof rack of the vehicle.

In an embodiment, the elongated base section comprises a fixed anchor fixedly mounted thereto, the link proximal end of the set of pivoting links being pivotally connected to the fixed anchor.

In an embodiment, the arm proximal end of the pivoting arm is pivotally connected to the fixed anchor.

In an embodiment, the pivoting arm is engageable to the engagement surface of the elongated base section upon a predetermined angular displacement corresponding to the angular distance of which the pivoting arm is pivotable.

In an embodiment, the predetermined angular distance of which the pivoting arm is pivotable ranges between 90 degrees and 25 degrees.

In an embodiment, the predetermined angular distance of which the pivoting arm is pivotable ranges between 55 degrees and 35 degrees.

In an embodiment, the article support comprises a substantially horizontal section.

In an embodiment, the set of pivoting links and the article support are configured to maintain the substantially horizontal section of the article support in a substantially horizontal orientation during the transition between the transport configuration and the loading configuration.

In an embodiment, the article support comprises at least two substantially horizontal section spaced apart from one another and the handle is adjustably securable to an outer end of the at least two substantially horizontal sections.

In an embodiment, the lift-assisted rack further comprises a final phase movement dampener configured to provide further resistance to the pivoting of the set of pivoting links, during a final phase of an angular movement of the pivoting links where the lift-assisted rack is proximate to the loading configuration.

In an embodiment, the final phase of the angular movement of the set of pivoting links comprises an angular displacement of the pivoting links ranging between the last 60 degrees before the lift-assisted rack reaches the loading configuration and the last 20 degrees before the lift-assisted rack reaches the loading configuration.

In an embodiment, the final phase movement dampener comprises a linear damper having an end mounted to one of the links of the set of pivoting links.

In an embodiment, the final phase movement dampener comprises at least one dampening pad lining a section of the fixed base and being positioned directly adjacent to the set of pivoting links, at the link proximal end thereof.

In an embodiment, the lift-assisted rack, further comprises a locking mechanism having at least one locking lever movable from a locked position where the lift-assisted rack is locked in the transport configuration and an unlocked position where the lift-assisted rack is pivotable towards the loading configuration.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIGS. 2A to 2G are isometric views of the lift-assisted rack of FIG. 1 and being pivoted between the transport configuration and a loading configuration, wherein FIG. 2A shows the lift-assisted rack in the transport configuration; FIG. 2B shows the lift-assisted rack in the transport configuration, with locking levers of the locking assembly opened; FIG. 2C shows the lift-assisted rack in the transport configuration, with locking assembly unlocked; FIG. 2D shows the lift-assisted rack in a first intermediate configuration; FIG. 2E shows the lift-assisted rack in a second intermediate configuration; FIG. 2F shows the lift-assisted rack in a third intermediate configuration; and FIG. 2G shows the lift-assisted rack in the loading configuration.

FIGS. 3A to 3C are close-up isometric views of the locking assembly of the lift-assisted rack of FIG. 1, wherein FIG. 3A shows the locking assembly in the locked configuration with the locking levers in the closed position; FIG. 3B shows the locking assembly in the locked configuration with the locking levers in the open position; and FIG. 3C shows the locking assembly in the unlocked configuration.

FIG. 4A is a close-up view of a portion of the lift-assisted rack of FIG. 1 showing one of the substantially horizontal section of the article support adjustably connected to the handle.

FIG. 4B is an exploded view of the portion of the lift-assisted rack of FIG. 1 shown in FIG. 4A.

FIGS. 6A to 6F are isometric views of a lift-assisted rack in accordance with an alternative embodiment and being pivoted between the transport configuration and the loading configuration, wherein FIG. 6A shows the lift-assisted rack in the transport configuration; FIG. 6B shows the lift-assisted rack in the transport configuration, with the locking assembly unlocked; FIG. 6C shows the lift-assisted rack in a first intermediate configuration; FIG. 6D shows the lift-assisted rack in a second intermediate configuration; FIG. 6E shows the lift-assisted rack in a third intermediate configuration; and FIG. 6F shows the lift-assisted rack in the loading configuration.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the lift-assisted rack for a vehicle and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the lift-assisted rack for a vehicle, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
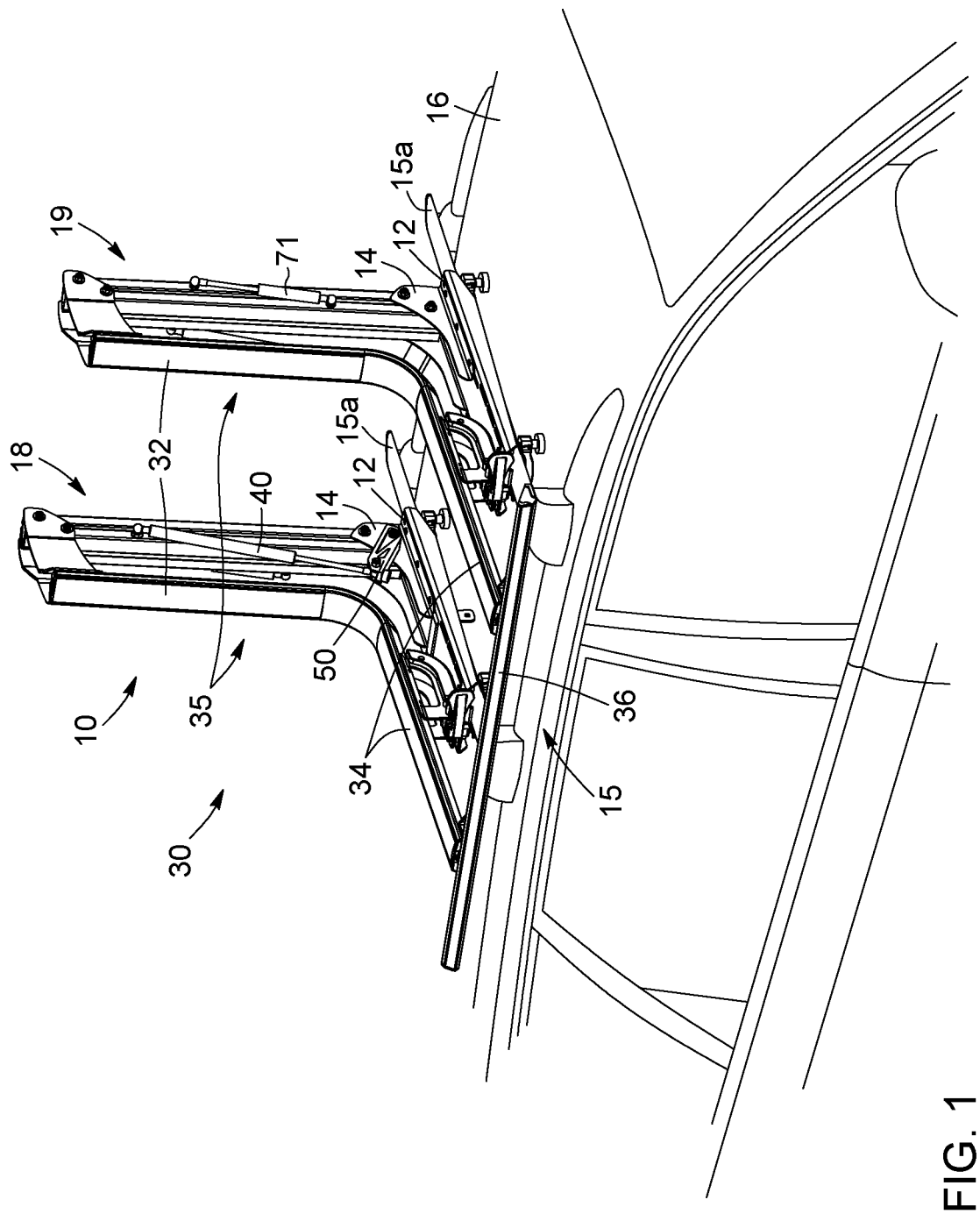
FIG. 1 is an isometric view of the lift-assisted rack shown mounted on a roof rack of a vehicle and in a transport configuration, in accordance with an embodiment.
Figure 2A:
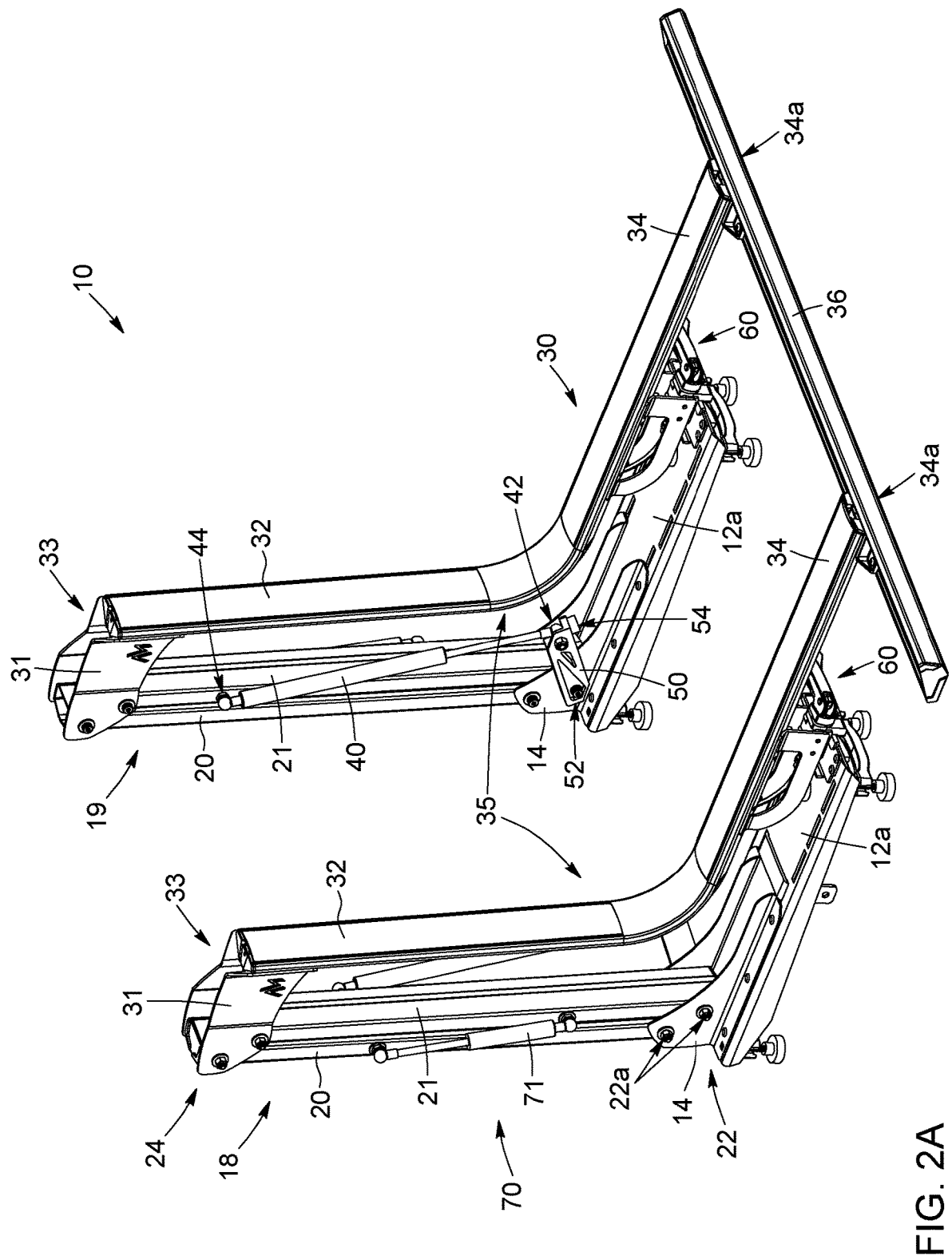
Figure 2B:
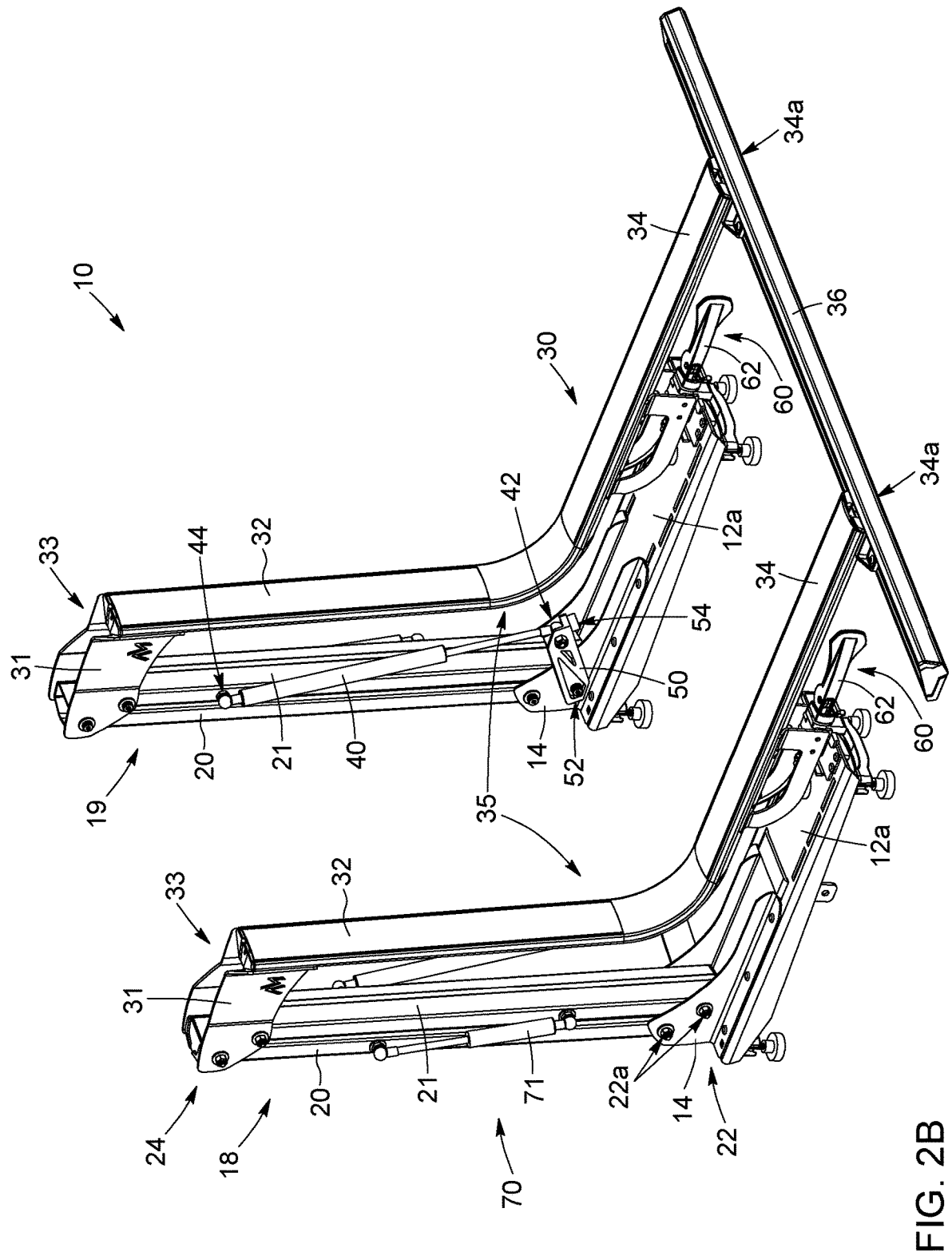
Figure 2C:
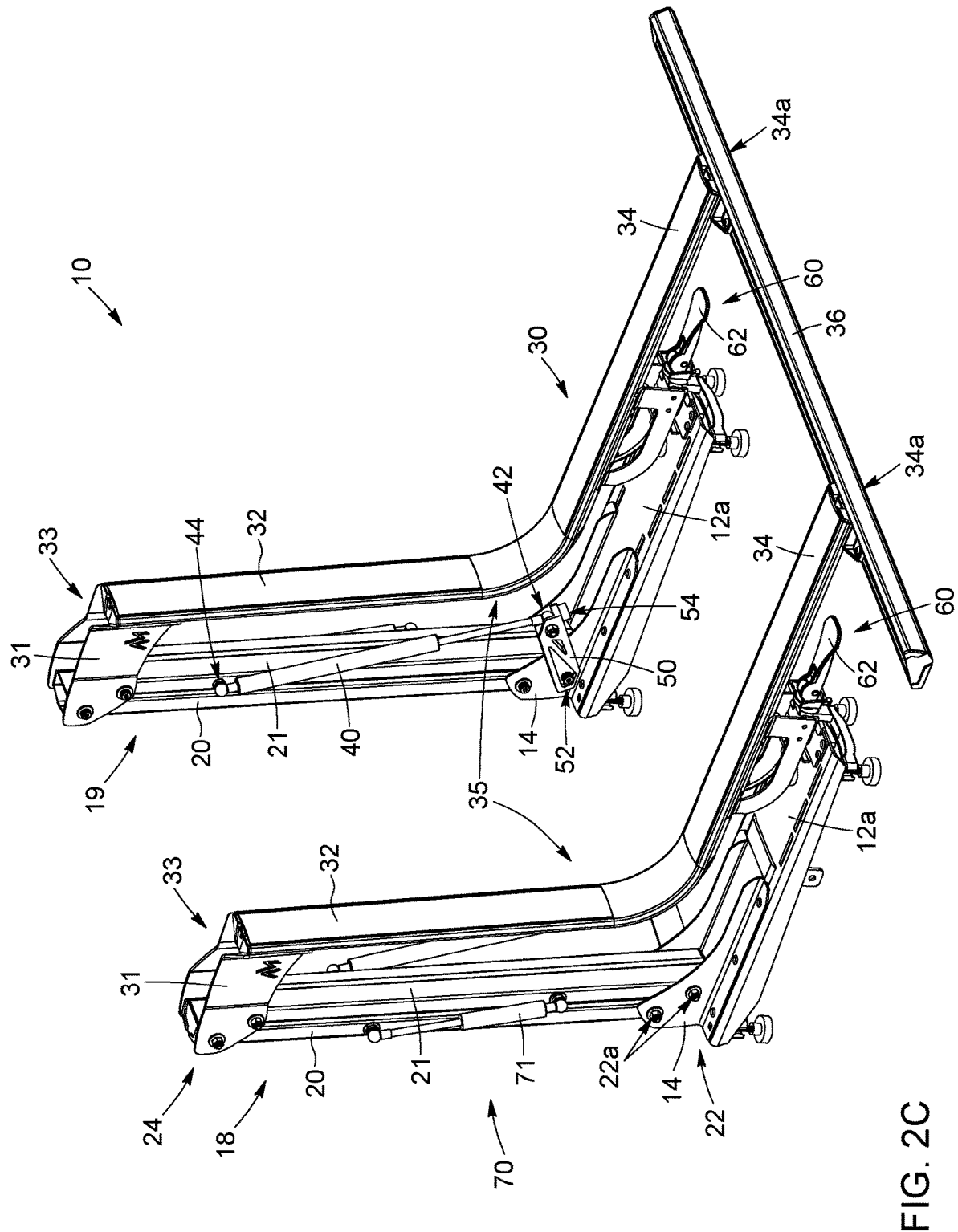
Figure 2D:
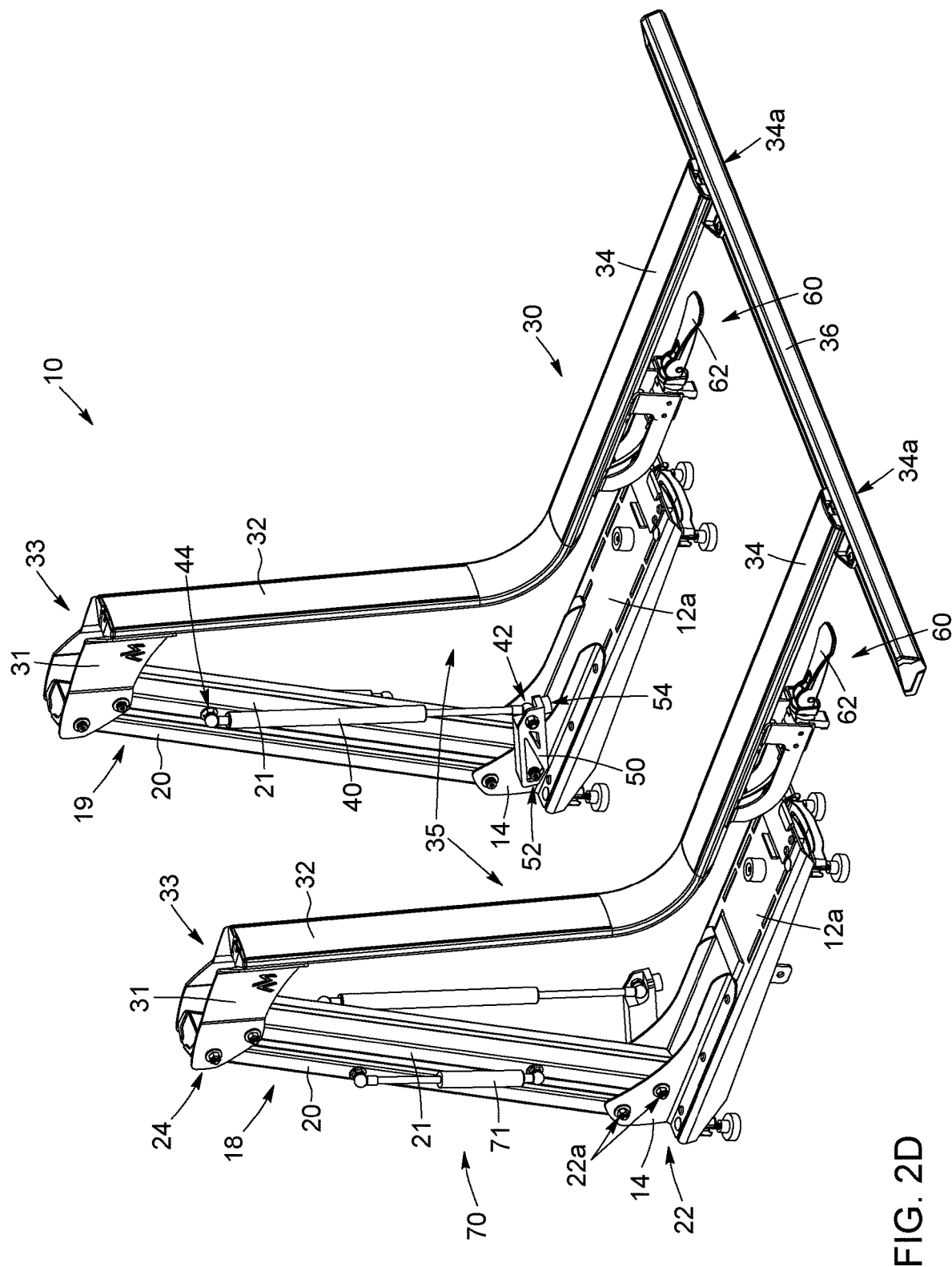
Figure 2E:
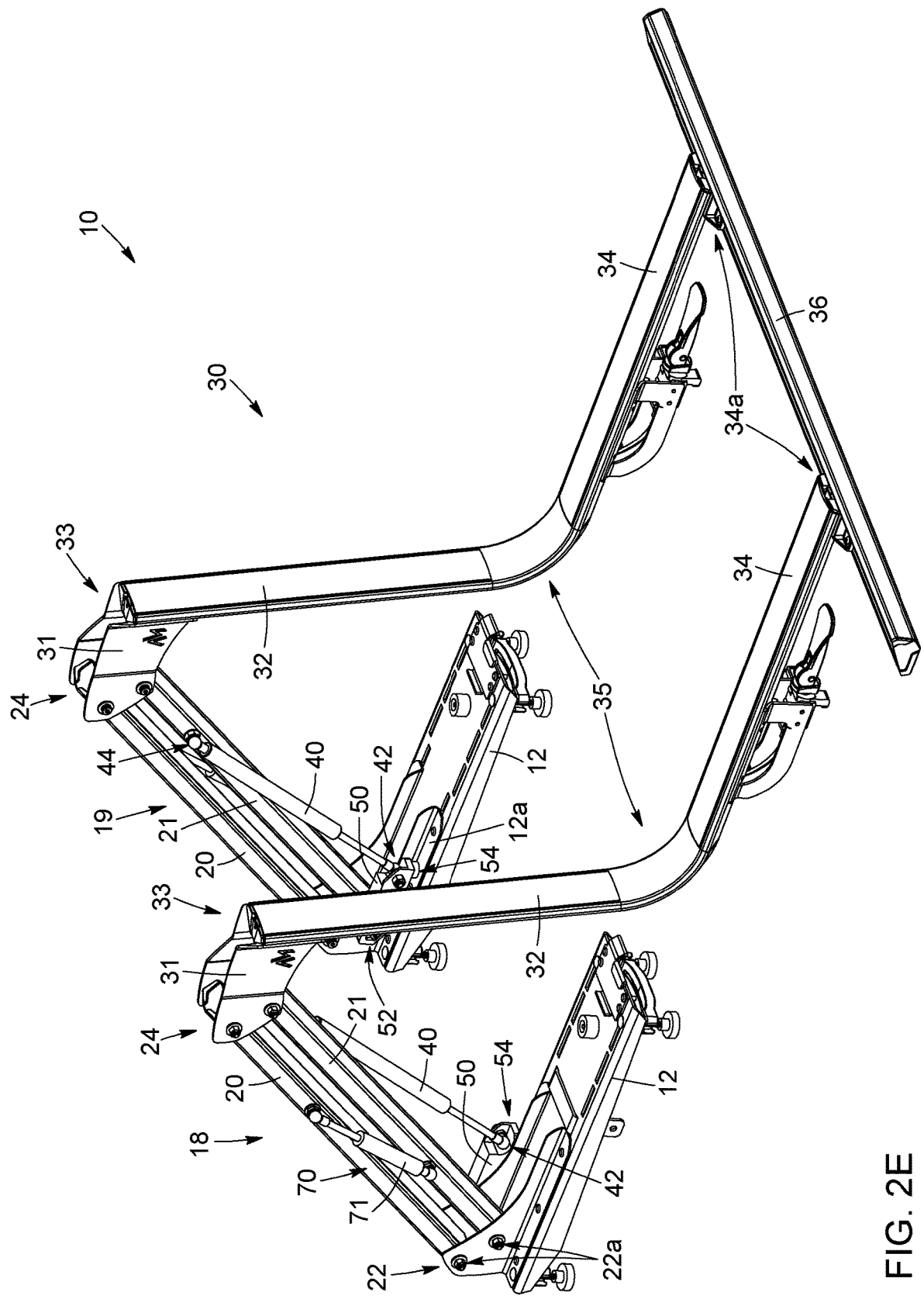
Figure 2F:
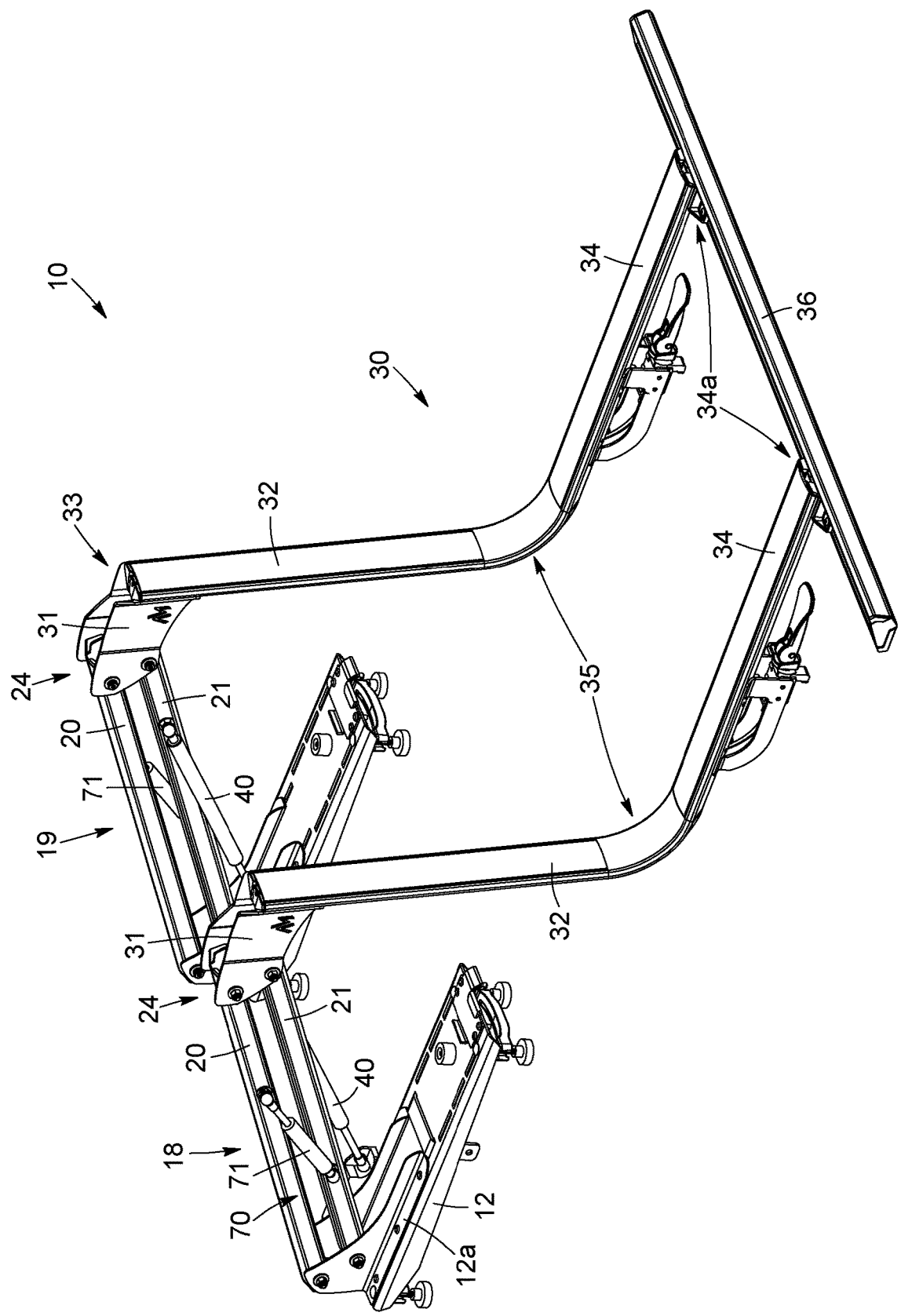
Figure 2G:
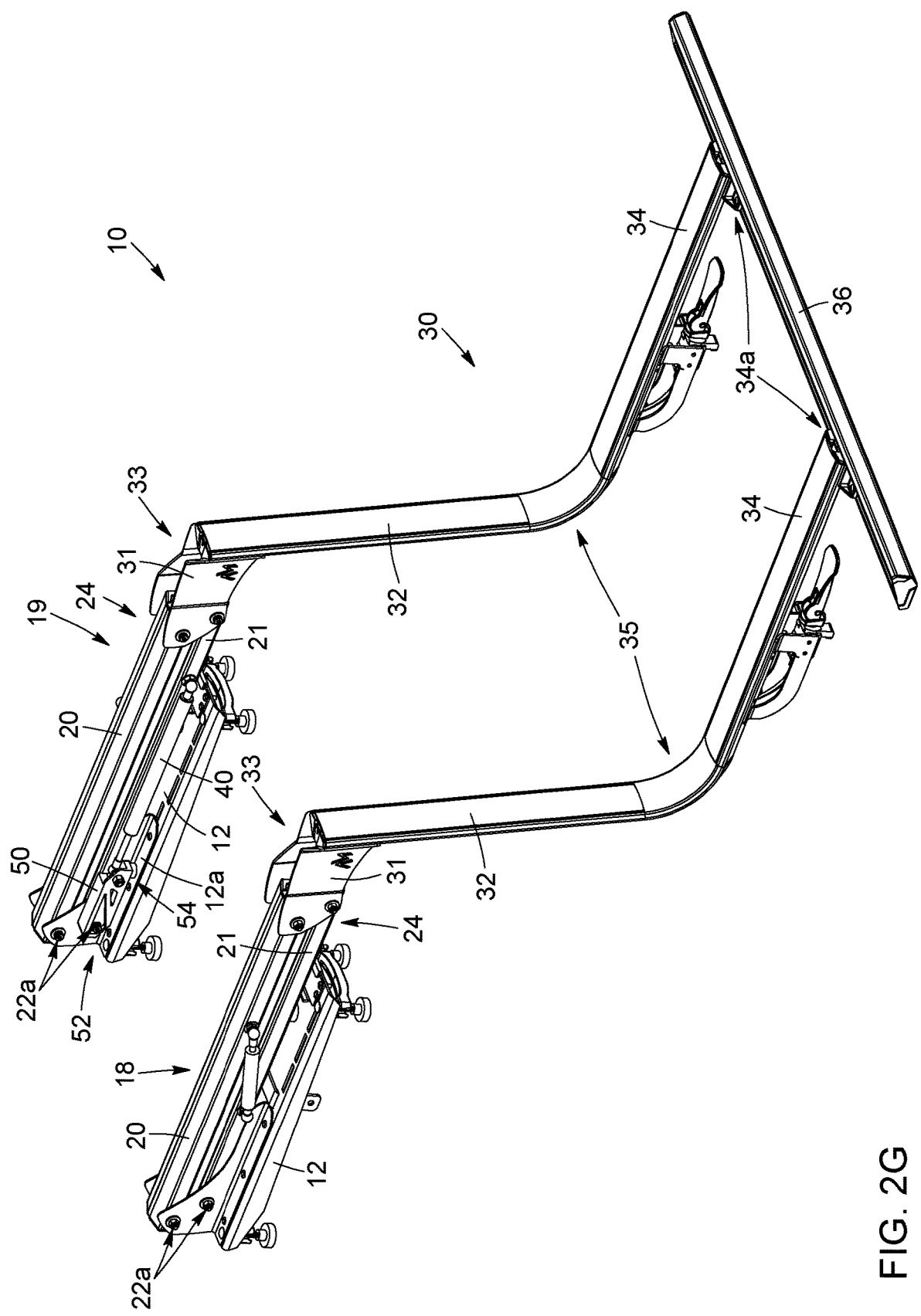

In general terms, and referring generally to FIGS. 1 to 2G, there is provided a lift-assisted rack 10 pivotable between a transport configuration (see FIG. 2A) and a loading configuration (see FIG. 2G). As can be seen in FIGS. 2A to 2G, the design of the lift-assisted rack 10 allows a transition from the transport configuration (shown in FIGS. 1 and 2A, where the lift-assisted rack 10 is configured in a compacted arrangement and is positioned substantially entirely over a vehicle 16), to the loading configuration (shown in FIG. 2G, where the lift-assisted rack 10 is configured in a deployed arrangement, with an article support 30 of the lift-assisted rack 10 being extended in a cantilever position and lowered towards the ground). In an embodiment, in the loading configuration, the article support 30 of the lift-assisted rack 10 is lowered and extends laterally from the vehicle 16 onto which the lift assisted rack 10 is mounted, with the substantially vertical section 32 thereof being substantially parallel to a corresponding side panel of the vehicle 16 and the substantially horizontal sections 34 thereof being substantially perpendicular to the corresponding side panel of the vehicle 16. As will be better understood in view of the description below, the design of the lift-assisted rack 10 minimizes the force required in order to perform at least a first portion of the displacement of the article support 30, to move the rack 10 from the transport configuration to the loading configuration, as will be described in more details below.

In accordance with the embodiment shown in FIGS. 1 to 2G, there is shown the lift-assisted rack 10 for a vehicle. The lift-assisted rack 10 is designed to be mounted on a roof rack 15 of a vehicle 16. In order to do so, the lift-assisted rack 10 includes elongated base sections 12 (operating as fixed base) securable to the roof bars 15a of a roof rack 15 of a corresponding vehicle 16. The base sections 12 have an engagement surface 12a. In the course of the present document, the term "engagement surface" is used to refer either directly to an upper surface of the base sections 12 or to any adjacent surfaces onto which a component can abut to engage the base section 12, such as, for example and without being limitative, a surface of a bracket, anchor or the like mounted on the base sections, a surface of an abutment stopper extending from the upper surface of the base sections, etc.

In the embodiment shown, two elongated base sections 12 spaced apart from one another and positioned to be mounted to corresponding roof bars 15 extending transversally on a roof of a vehicle 16 are provided. One skilled in the art will understand that, in alternative embodiments (not shown), more or less than the two elongated base sections 12 could be provided. Moreover, the base sections 12 (or fixed base) could be embodied using different component(s) or component(s) having a different configuration, to secure the lift-assisted rack 10 to the roof of the vehicle 16 directly or indirectly (e.g. without the use of roof bars).

In the embodiment shown, the lift-assisted rack 10 also includes two sets 18, 19 of pivoting links 20, 21 (or bars) spaced apart from one another, an article support 30 operatively connected to the two sets 18, 19 of pivoting links 20, 21 and lift-assisting struts (or shock absorber) 40 cooperating with each set of pivoting links 20, 21 to capture and control the load when a loaded rack 10 (i.e. the rack 10 with an article secured thereto) is pivoted between the transport configuration (see FIG. 2A) and the loading configuration (see FIG. 2G), and assist in the inverse movement of the rack 10 (i.e. assist the movement of the rack 10 during a portion of the movement between the loading configuration (see FIG. 2G) and the transport configuration (see FIG. 2A)), as will be described in more details below. In the embodiment shown, the lift-assisted rack 10 also includes linear dampers 71 (or velocity controllers) operating as a final phase movement dampener 70, to further control the load and provide a smooth deceleration of the rack in a final phase of the movement between the transport configuration and the loading configuration, as will be described in more details below.

Each set 18, 19 of pivoting links 20, 21 is associated to a corresponding elongated base section 12 and has a proximal end 22 and a distal end 24. The proximal end 22 is the end positioned proximate to the corresponding elongated base section 12, while the distal end 24 is the opposed end positioned the farthest from the corresponding elongated base section 12, when the lift-assisted rack 10 is configured in the transport configuration, as shown in FIG. 1. Each set 18, 19 of pivoting links 20, 21 is pivotally mounted relative to the corresponding elongated base sections 12 at the proximal end 22 thereof (i.e. each link 20, 21 of each set 18, 19 of pivoting links 20, 21 is pivotally mounted relative to the corresponding elongated base sections 12 at the proximal end 22 thereof). As will be better seen in reference with FIGS. 2A to 2G, the links 20, 21 of each set 18, 19 of pivoting links 20, 21 move in parallel to one another during the pivoting thereof. In addition, the two sets 18, 19 of pivoting links 20, 21, move synchronously during the pivoting movement of the rack 10 (i.e. the corresponding links 20, 21 of the sets 18, 19 of pivoting links 20, 21, move in such a way as to pivot simultaneously and maintain a matching angular position, during the pivoting movement thereof). One skilled in the art will understand that, in alternative embodiments (not shown), a single set of pivoting links 20, 21, or more than two sets of pivoting links 20, 21 could be provided. Moreover, in other alternative embodiments (not shown), each set of pivoting links 20, 21 could be replaced by a single pivoting link or could include more than the two pivoting links 20, 21 of the embodiment shown, pivoting parallelly to one another.

In the embodiment shown, each elongated base section 12 has a fixed anchor 14 mounted thereto and each set 18, 19 of pivoting links 20, 21 is pivotally coupled to the anchor 14 of the corresponding elongated base sections 12, to provide the pivotal connection of the pivoting links 20, 21 relative to the elongated base section 12. The fixed anchors 14 are fixedly mounted to the elongated base section 12, such that the position of the pivot points 22a of the proximal end 22 of the pivoting links 20, 21 is static relative to the corresponding elongated base section 12 (i.e. the position of the pivot points 22a always remains constant as the rack 10 is moved between the transport configuration and the loading configuration). It will be understood that, in an alternative embodiment (not shown), the fixed anchors 14 could be integral to the elongated base sections 12 (i.e. the fixed anchors 14 and the elongated base sections 12 could be defined in a single piece or component).

One skilled in the art will understand that, in alternative embodiments (not shown), each links 20, 21 of the sets of pivoting links 20, 21 could also be operatively connected to the corresponding elongated base section 12 differently than via the fixed anchors 14 of the embodiment shown, while still providing a static position of the pivot points 22a of the proximal end 22 of the pivoting links 20, 21 relative to the corresponding elongated base section 12. For example and without being limitative, in an embodiment (not shown), a section of the pivoting links 20, 21 could extend along a side of the elongated base section 12 (or along opposed sides thereof), or extend through a hollow section thereof, and be pivotally mounted directly thereto. In other alternative embodiments (not shown), the elongated base section 12 could be omitted and the fixed anchors 14 could be mounted directly to third-party components, such as corresponding roof bars (not shown) of a roof rack (not shown). In such alternative embodiments (not shown), the third-party components would thereby constitute what is defined herein as the "base section" or "fixed base" for connecting the rack 10 to the roof racks (not shown).

Still referring to FIG. 1, the article support 30 is the portion of the rack 10 designed for loading the articles on the rack 10 (i.e. the portion of the rack for receiving the articles thereon). In the embodiment shown, the article support 30 is "L" shaped and includes two matching L shaped bracket 35 laterally spaced apart from one another and each having a substantially vertical section 32 and a substantially horizontal section 34. The substantially vertical section 32 of each bracket 35 has an upper end 33 pivotally connected to the distal end 24 of the links 20, 21 of a corresponding set 18, 19 of pivoting links 20, 21. In the embodiment shown, a connector 31 extends from the substantially vertical section 32 of each bracket 35, at the upper end 33 thereof, to pivotally connect the corresponding bracket 35 of the article support 30 to the distal end 24 of the corresponding set 18, 19 of pivoting links 20, 21. In the embodiment shown, the connectors 31 extend substantially horizontally, but one skilled in the art will understand that, in an alternative embodiment (not shown), the connectors 31 could be angled relative to a substantially horizontal axis. It will also be understood that, in an alternative embodiment (not shown), the connectors 31 could be integral to the substantially vertical section 32 of each bracket 35 (i.e. connector 31 and the substantially vertical section 32 of each bracket 35 could be defined in a single piece or component). One skilled in the art will also understand that, in an alternative embodiment (not shown), the connectors 31 could extend from the distal end 24 of the sets 18, 19 of pivoting links 20, 21 (or be integral therewith) or that no connector could be provided (e.g. with the substantially vertical section 32 being angled relative to a substantially vertical axis rather than being substantially vertical).

In the embodiment shown, the substantially horizontal sections 34 are connected by a handle 36 section extending therebetween, at an outer end 34a thereof, to connect the brackets 35 and provide rigidity to the rack 10.

Referring to FIGS. 1 and 4A to 5, in the embodiment shown, the handle 36 is adjustably securable to the substantially horizontal sections 34, at the outer end 34a, to allow adjustment of the width of the rack 10 (i.e. to allow adjustment of the distance between the brackets 35 of the article support 30). For example, in FIG. 5 the distance between the brackets 35 of the article support 30 is greater than in FIG. 1. In order to provide such adjustable securement of the handle 36 to the substantially horizontal sections 34, in the embodiment shown, the handle 36 has elongated rails 37 sized and shaped to receive nuts 38 therein. The elongated rails 37 have a greater width at a bottom section thereof than at the top, to allow the nuts 38 to slide therein, while restraining vertical displacement of the nuts 38 and preventing the nuts 38 from being removed from the rails 37. The substantially horizontal sections 34 are configured to receive bolts 39 insertable through a section thereof and threadable into the nuts 38. Hence, the bolts 39 can be tightened with the nuts 38 to secure the handle 36 to the substantially horizontal sections 34 (see FIG. 4A) in the desired position and the position can be adjusted by simply untightening the bolts 39, sliding the substantially horizontal sections 34 along the handle 36 and retightening the bolts 39. Once again, one skilled in the art will easily understand that, in alternative embodiments (not shown) different assemblies could also be provided to adjustably secure the handle 36 to the substantially horizontal sections 34.

As can be seen in FIGS. 2A to 2G, the lift-assisted rack 10 is designed such that the substantially horizontal sections 34 of the article support 30 remain substantially horizontal throughout the pivoting of the lift-assisted rack 10 between the transport configuration (See FIG. 2A) and the loading configuration (see FIG. 2G) and vice-versa.

Referring to FIGS. 1 to 2G, in order to assist in the transition of the rack 10 between the transport configuration (see FIG. 2A) and the loading configuration (see FIG. 2G) and vice-versa, the lift assisted rack 10 further includes the lift-assisting struts (or shock absorber) 40. In the embodiment shown, two lift-assisting struts 40 are provided, each lift-assisting strut 40 cooperating with a corresponding set 18, 19 of pivoting links 20, 21. One skilled in the art will however understand that, in an alternative embodiment (not shown), a different amount of lift-assisting struts 40 could be provided. When the rack 10 is loaded with an article (especially a heavy article such as a watercraft or the like), the lift-assisting strut 40 helps controlling the movement of the article support 30 of the rack 10 during a portion of the movement, thereby preventing the article support 30 from being lowered too rapidly towards the ground and/or facilitating the upward movement of the article support 30 during a portion of the movement towards the transport configuration.

In the embodiment shown, each lift-assisting strut 40 is a piston, such as, for example and without being limitative, a gas piston, a hydraulic piston, a spring-loaded piston or the like. One skilled in the art will however understand that, in an alternative embodiment, other linear shock absorbers could be used.

The lift-assisting struts 40 has a proximal end 42 and a distal end 44. The proximal end 42 is the end positioned proximate to the corresponding elongated base section 12 (or the proximal end of the corresponding set 18, 19 of pivoting links 20, 21), while the distal end 44 is the opposed end, which is positioned the farthest from the corresponding elongated base section 12 (or closest to the distal end 24 of the corresponding set of pivoting links 20, 21). The distal end 44 of each lift-assisting strut 40 is pivotally connected to one of the pivoting links 20, 21 of the corresponding set 18, 19 of pivoting links 20, 21.

In order to allow a substantially resistance free angular range of motion to the rack 10, during a predetermined pivoting segment performed adjacent to the transport configuration, as will be described in more details below, the proximal end 42 of each lift-assisting strut 40 is pivotally connected to a pivoting arm (or link) 50. The pivoting arm 50 is pivotable relative to the corresponding elongated base section 12 (and the associated anchor 14) and therefore allows the proximal end 42 of each lift-assisting strut 40 to move angularly relative to the corresponding elongated base section 12, without resistance from the corresponding lift-assisting strut 40, for a predetermined angular distance. For example and without being limitative, in an embodiment, the predetermined angular distance of which the proximal end 42 can move is between about 90 degrees and about 25 degrees (i.e. the proximal end 42 has an angular range greater or equal to about 25 degrees, but smaller or equal to about 90 degrees). In an alternative embodiment, the predetermined angular distance of which the proximal end 42 can move is between about 55 degrees and about 35 degrees (i.e. the predetermined angular distance of which the proximal end 42 can move angularly is greater or equal to about 35 degrees, but smaller or equal to about 55 degrees). In an alternative embodiment, the predetermined angular distance of which the proximal end 42 can move is about 55 degrees.

In more details, in the embodiment shown, each pivoting arm 50 is pivotally connected at a proximal end 52 to the anchor 14 of the corresponding elongated base section 12 and is pivotally connected at a distal end 54 to the proximal end 42 of the corresponding lift-assisting strut 40. The pivoting arm 50 therefore provides an angular range of motion to the proximal end 42 of the corresponding lift-assisting strut 40, during the pivoting movement of the links 20, 21 of the corresponding set 18, 19 of pivoting links 20, 21 (which pivot while the pivot points 22a of their proximal end 22 remain in a constant position, relative to the corresponding elongated base section 12). In the embodiment shown, the pivoting arm 50 is engageable to the engagement surface 12a of a corresponding elongated base section 12, when reaching the end of its angular range of motion, as will be described in more details below. One skilled in the art will understand, that, in an embodiment, the pivoting arm 50 can be engageable to a damper or a similar element of the engagement surface 12a of the corresponding elongated base section 12.

In order to prevent undesired pivoting of the components of the rack 10 from the transport configuration (e.g. undesirable pivoting of the links 20, 21 of the corresponding set 18, 19 of pivoting links 20, 21 (e.g. as a result of the resistance free range of motion of the pivoting arm 50), in the embodiment shown, the lift assisted rack 10 includes a locking assembly 60 configured to allow locking of the rack 10 in the transport configuration. One skilled in the art will understand that several different assemblies could be used for the locking assembly.

Figure 3A:
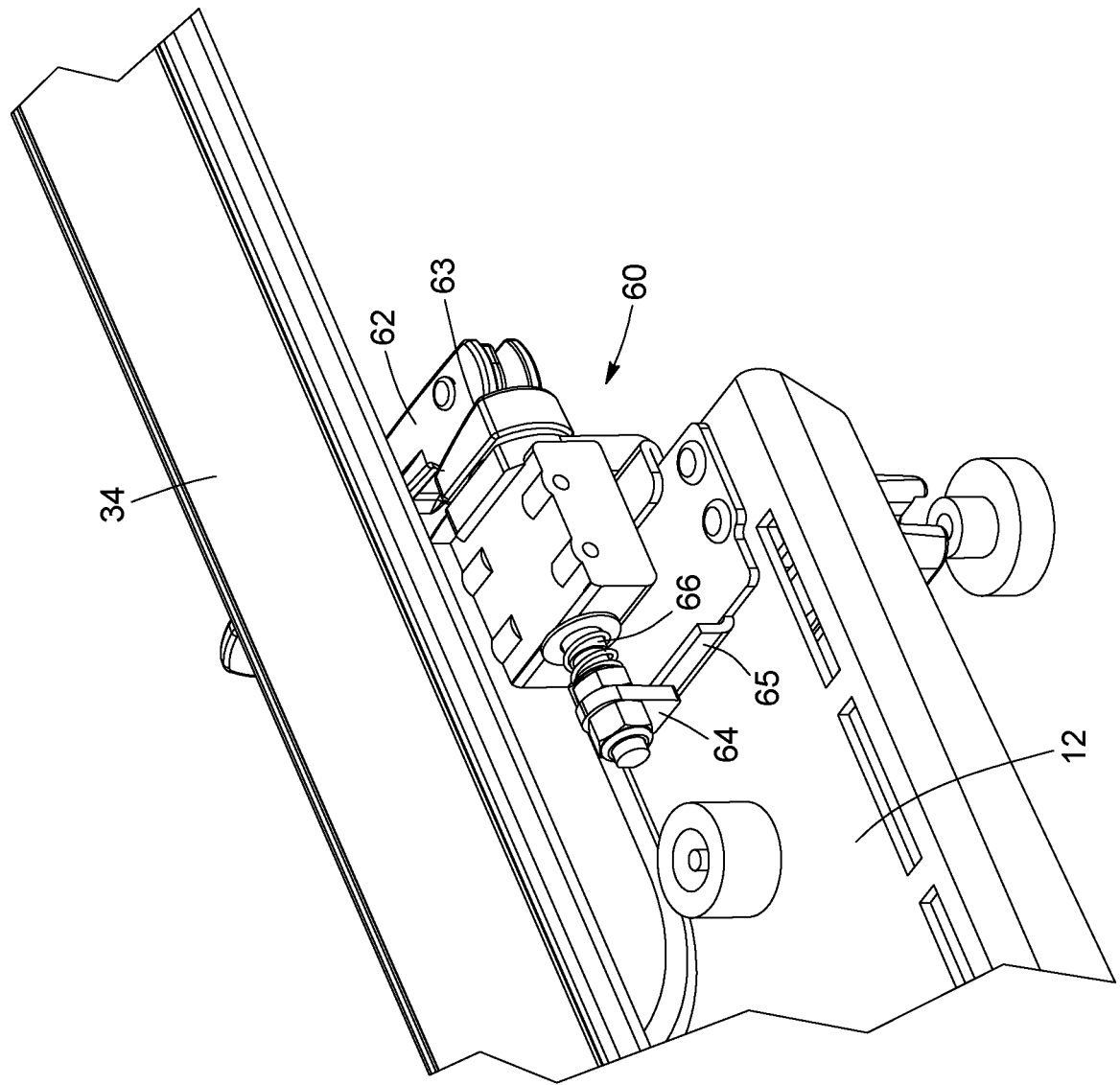
Figure 3B:
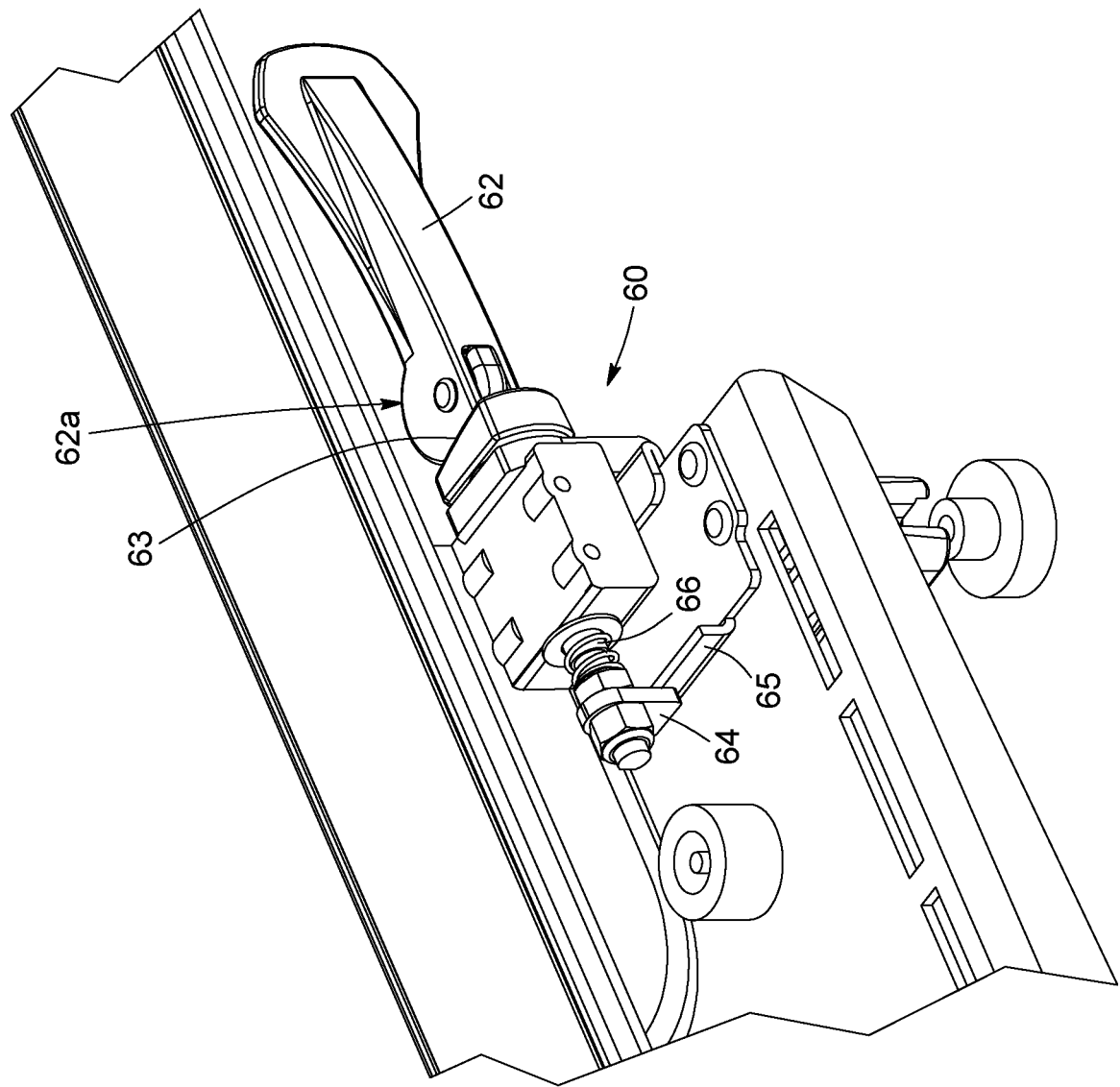
Figure 3C:
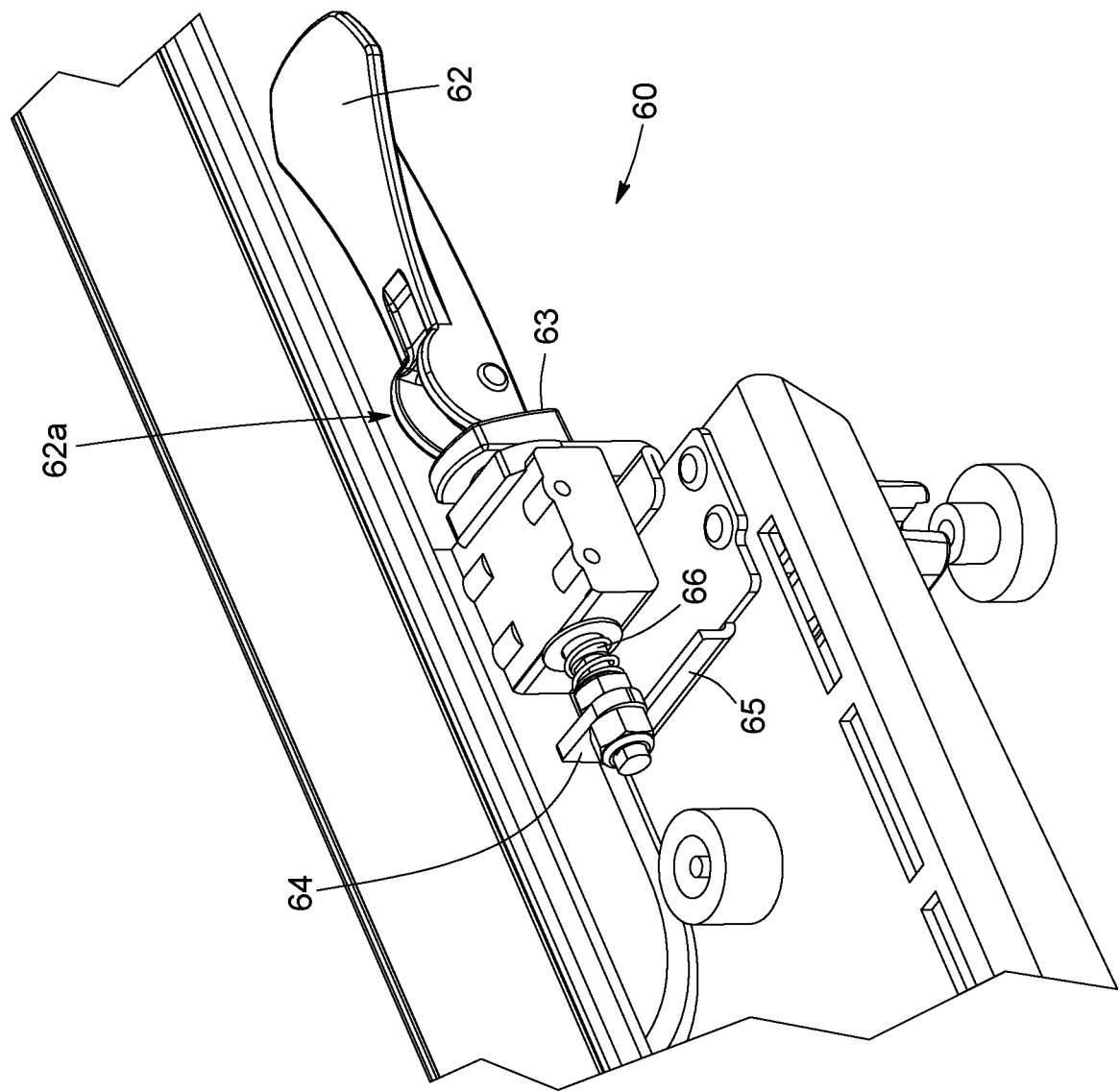
Figure 4C:
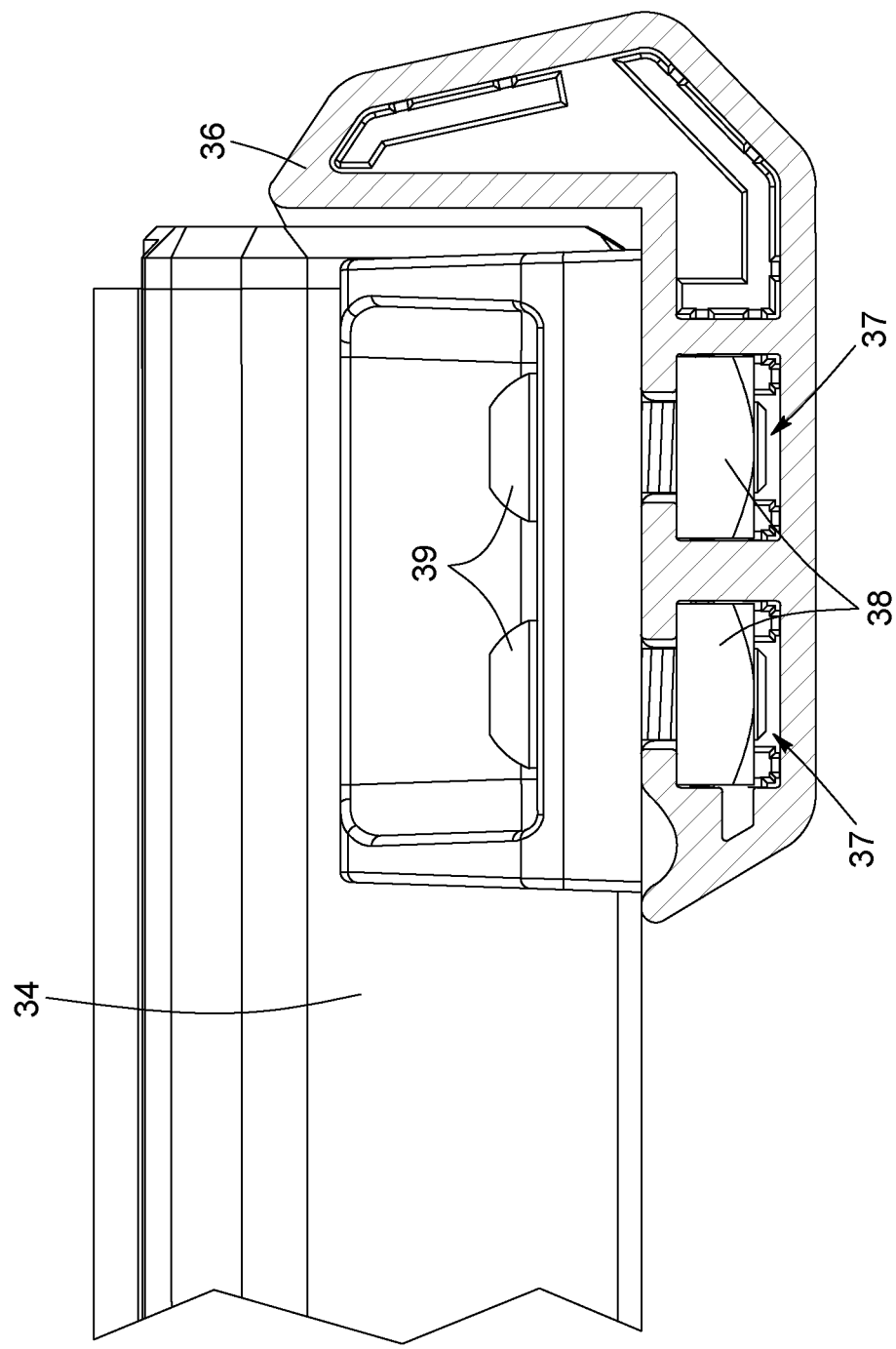
FIG. 4C is cross-section view of the portion of the lift-assisted rack of FIG. 1 shown in FIG. 4A, taken along lines C-C in FIG. 4A.
Figure 5:
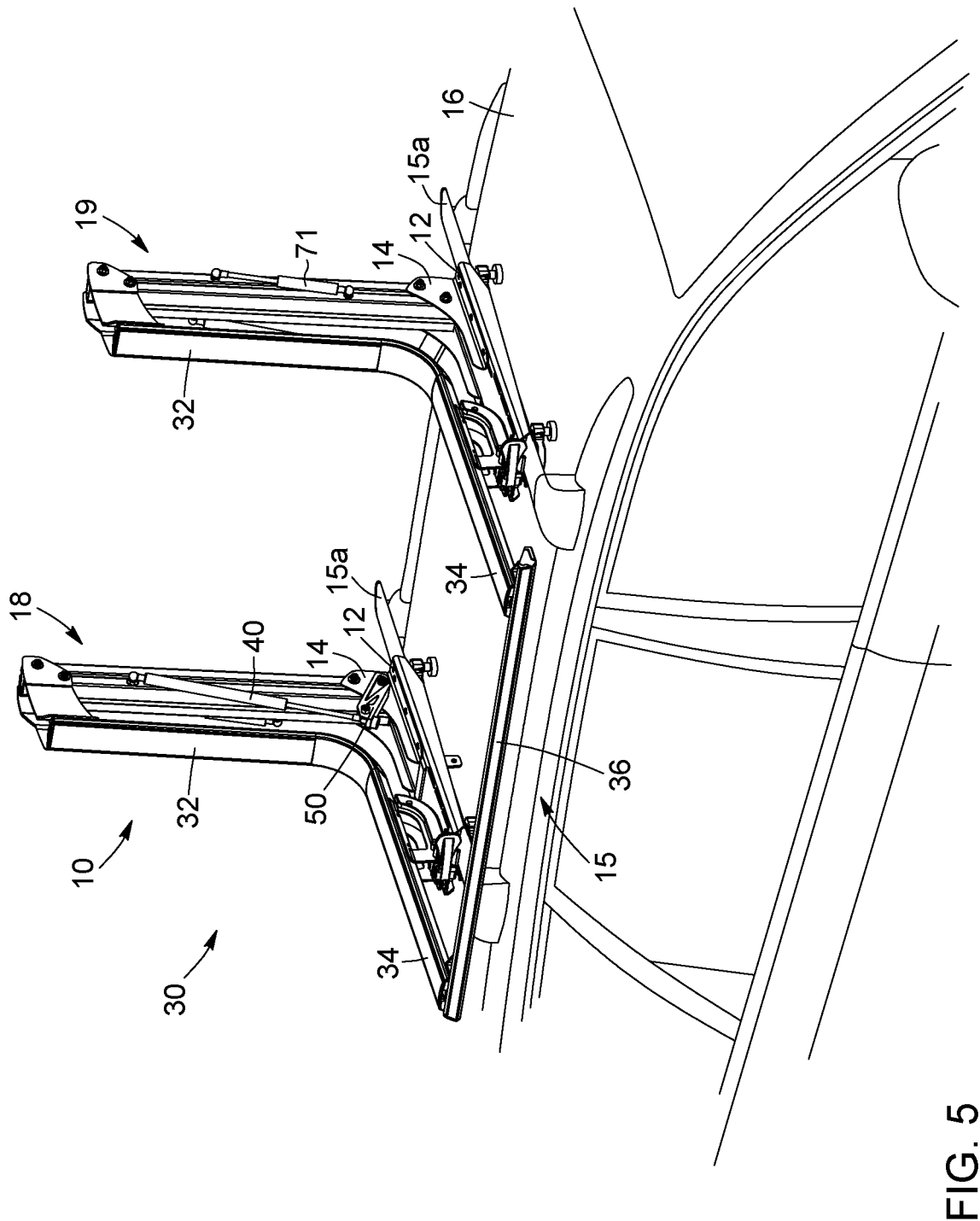
FIG. 5 is an isometric view of the lift-assisted rack if FIG. 1, shown mounted on a roof rack of a vehicle and in a transport configuration, with the handle of the article support being adjusted to increase the distance between brackets of the article support, as compared to FIG. 1.

In the embodiment shown, and as better seen in FIGS. 3A to 3C, the locking assembly 60 includes locking levers 62 pivotable between a closed position (see FIG. 3A) and an open position (see FIG. 3B). Once positioned in the open position (see FIG. 3B), the locking levers 62 are also rotatable between a locked position (see FIG. 3B) and an unlocked position (FIG. 3C). In the locked position, a rotating tab 64 extending at a rear portion of each locking lever 62 and rotating along therewith is locked against a locking tab 65 projecting upwardly from the corresponding base section 12, thereby preventing movement of the article support 30, relative to the base sections 12. When the locking levers 62 are rotated to the unlocked position, the rotating tab 64 is rotated and freed from the locking tab 65, thereby releasing the article support 30 and allowing pivoting movement of the rack 10 towards the loading configuration.

As can be seen in FIGS. 3A to 3C, the locking levers 62 each include a cam section 62a, where the associated portion of the lever 62 is cam shaped. In the closed position, engagement of the cam section 62a with an abutment surface 63 results in tension exerted on the connecting pin 66 connecting the lever 62 with the rotating tab 64, therefore frictionally engaging the rotating tab 64 with the locking tab 65 and thereby retaining the locking assembly 60 in the locked configuration (even in the occurrence of vibration occurring during displacement of the vehicle). When the locking levers 62 are pivoted from the closed position to the open position, each cam section 62a is gradually disengaged from the corresponding abutment surface 63, as a result of its cam shaped configuration, thereby releasing tension on the connecting pin 60 and the corresponding frictional engagement between the rotating tab 64 and the locking tab 65, to allow rotation of the locking levers 62 from the locked position to the unlocked position.

In the embodiment shown in FIGS. 1 to 2G, the lift-assisted rack 10 further includes linear dampers 71 operating as a final phase movement dampener 70, to provide greater resistance to pivoting of the lift-assisted rack 10, during the final phase of the transition towards the loading configuration (i.e. during a short angular movement of the pivoting links 20, 21 before the loading configuration is reached). For example and without being limitative, in an embodiment, the final phase of the transition towards the loading configuration corresponds to an angular distance of the pivoting links 20, 21 ranging between about 60 degrees and about 20 degrees before the loading configuration is reached (i.e. the linear dampers 71 provide a resistance (i.e. a non-negligible resistance force to movement of the rack) for an angular distance of the pivoting links 20, 21 smaller or equal to about 60 degrees before the loading configuration is reached and greater or equal to about 20 degrees before the loading configuration is reached).

The linear dampers 71 therefore provide further resistance to the pivoting movement of the pivoting links 20, 21 during the final phase of the transition towards the loading configuration, to provide a smooth transition towards the loading configuration, substantially without jerk as the loading configuration is reached. In other words, the linear dampers 71 minimize a final jerk generated as the rack reaches the loading configuration and the pivoting links 20, 21 suddenly stop pivoting (for example as a result of one link 21 of each set 18, 19 of pivoting links 20, 21 engaging the engagement surface 12a of the corresponding elongated base section 12). In the embodiment shown, a linear damper 71 is provided for each set 18, 19 of pivoting links 20, 21.

In the embodiment shown, the opposed ends of each one of the linear dampers 71 are each connected to a corresponding one of the pivoting links 20, 21 of the corresponding set 18, 19 of pivoting links 20, 21, such that the linear dampers 71 are compressed during the pivoting of the corresponding pivoting links 20, 21. The linear dampers 71 are configured to provide substantially no resistance to the pivoting movement of the pivoting links 20, 21 during a first compression phase thereof, such that they do not counteract the substantially resistance free angular range of motion of the rack 10 provided by pivoting of the pivoting arm, during the predetermined pivoting segment performed adjacent to the transport configuration, as described above. The linear dampers 71 are rather configured to provide additional resistance to the pivoting movement of the pivoting links 20, 21 only during a final compression phase thereof, which occurs as the article support 30 is moving close to the loading configuration, thereby providing the desired final phase movement dampening. In an embodiment, in order to prevent excessive acceleration of the article support when the rack 10 is moved from the loading configuration towards the transport configuration, the linear dampers 71 are one-way linear dampers (i.e. they provide dampening of motion in the compression direction but allow free (non-damped) motion in the tension direction).

One skilled in the art will understand that, in alternative embodiments (not shown), the linear dampers 71 could be mounted differently to the rack 10 to provide dampening in tension, rather than in compression. Moreover, it will be understood that any type of linear damper, such as, for example and without being limitative a gas damper, hydraulic damper, spring-loaded damper or the like could be used. One skilled in the art will also understand that, in alternative embodiments, different assemblies than the linear dampers 71 of the embodiment shown could be used to perform the desired final phase movement dampening. One possible final phase movement dampener 70 using dampening pads, will for example be described below in connection with FIGS. 6A to 6F.

In view of the above, referring to FIGS. 2A to 2G in operation, when the lift-assisted rack 10 is pivoted between the transport configuration (shown in FIG. 2A) and the loading configuration (shown in FIG. 2G) and vice-versa, the pivoting occurs in substantially three stages. An initial stage substantially without resistance/assistance (as shown in FIGS. 2C and 2D), a subsequent stage with resistance/assistance from the lift-assisting struts 40 (as shown starting in FIG. 2E) and a final stage with resistance from the lift-assisting struts 40 and the linear dampers 71 (as shown starting in FIG. 2F).

In more details, FIG. 2A shows the lift-assisted rack 10 in a transport configuration used to transport article (not shown) onto the roof of a vehicle (not shown). In FIG. 2A, the locking levers 62 of the locking assembly 60 are in the closed position (as shown in FIG. 3A).

FIGS. 2B and 2C show the locking assembly 60 being opened and unlocked. In FIG. 2B, the locking levers 62 of the locking assembly 60 are moved to the open position, with the levers 62, still being in the locked position. As previously mentioned, in the locked position, the rotating tab 64 of each locking lever 62 is locked against a locking tab 65 projecting upwardly from the corresponding base section 12, thereby locking the article support 30 in the transport configuration (see FIG. 3B). In FIG. 2C, the locking levers 62 of the locking assembly 60 are rotated to the unlocked position, thereby unlocking the locking assembly 60. As previously mentioned, in the unlocked position, the rotating tab 64 of each locking lever 62 is freed from the locking tab 65 projecting upwardly from the corresponding base section 12, thereby unlocking the article support 30 from the transport configuration (see FIG. 3C)

FIG. 2D shows the initial pivoting of the lift-assisted rack 10 towards the loading configuration, performed by a user grasping the handle 36 of the article support 30 and pulling the article support 30 outwardly and towards the ground. In the initial stage of pivoting of the rack 10, the pivoting links 20, 21 are pivoted (with the pivot points 22a of their proximal ends 22 always remaining in an unchanged position, relative to the corresponding elongated base sections 12). The pivoting arms 50 also pivot, thereby moving the proximal ends 42 of the lift-assisting struts 40 towards the elongated base sections 12. Hence, during this stage, the lift-assisted rack 10 pivots, without substantial resistance/assistance from the lift-assisting strut 40 or the linear damper 71.

FIG. 2E shows the stage where the pivoting arms 50 reach the end of their angular range and engage the engagement surface 12a of the elongated base sections 12. In the embodiment shown, the article support 30 is brought in a cantilevered position during the initial pivoting stage (i.e. before the pivoting arms 50 engage the elongated base sections 12).

FIG. 2F shows the subsequent pivoting stage of the lift-assisted rack 10 towards the loading configuration, again performed by a user grasping the handle 36 of the article support 30 and pulling the article support 30 outwardly and towards the ground. During this subsequent pivoting stage, the position of the proximal ends 42 of the lift-assisting struts 40 relative to the elongated base sections 12 remains unchanged (as a result of the pivoting arms 50 engaging the engagement surface 12a of the elongated base sections 12). Hence, further pivoting of the pivoting links 20, 21 causes the lift-assisting strut 40 to be compressed, thereby imparting resistance to the pivoting of the pivoting links 20, 21 by the lift-assisting strut 40. The resistance to the pivoting of the pivoting links 20, 21 by the lift-assisting strut 40 at this stage is advantageous, as it helps control the downward movement of the article support 30 (especially when it is loaded with a heavy article such as a watercraft or the like) to prevent a downward movement that is too quick or that requires substantial force from the user to support the article support 30 in its downward motion.

FIG. 2G shows the lift-assisted rack 10 having reached the loading configuration, with a link 21 of each set of pivoting links 20, 21 engaging (or abutted onto) the engagement surface 12a of the corresponding elongated base section 12 (or a dampening pad or the like extending therefrom), with the article support 30 extending in a cantilevered position, along a side of the vehicle (not shown).

As mentioned above, during the pivoting stage occurring between positions approximately similar to those shown in FIG. 2F and FIG. 2G, the linear dampers 71 are compressed and impart a further resistance to the pivoting of the pivoting links 20, 21, to provide a smooth transition towards the loading configuration, substantially without jerk as the loading configuration is reached. As described above, the linear dampers 71 are adjusted such that compression during an initial compression stage (i.e. compression occurring before reaching a position approximately similar to the position shown in FIG. 2F) impart substantially no resistance, such that the linear dampers 71 operate as final phase movement dampeners 70 only.

It will be understood that, when the lift-assisted rack 10 is pivoted between the loading configuration and the transport configuration, the pivoting occurs in the reverse stages of FIGS. 2A to 2G, with the lift-assisting strut 40 imparting assistance to the pivoting of the pivoting links 20, 21 until the pivoting arms 50 are disengaged from the engagement surface 12a of the elongated base sections 12. The final pivoting of the lift-assisted rack 10 is therefore performed without assistance from the lift-assisting strut 40. Once the lift-assisted rack 10 has reached the transport configuration, it can be locked in place locking and closing the locking assembly 60. As mentioned above, in an embodiment, the linear dampers 71 are one-way dampers and therefore provide free motion when the lift-assisted rack 10 is pivoted between from the loading configuration to the transport configuration.

Referring to FIGS. 6A to 6F, there is shown an alternative embodiment of the lift-assisted rack 110, wherein the features are numbered with reference numerals in the 100 series which correspond to the reference numerals of the previous embodiment.

Similarly to the previous embodiment, in the alternative embodiment shown in FIGS. 6A to 6F, the lift-assisted rack 110 includes elongated base sections 112 (operating as fixed base) securable to the roof bars (not shown) of a roof rack (not shown) of a corresponding vehicle (not shown), two sets 118, 119 of pivoting links 120, 121 (or bars) spaced apart from one another, an article support 130 operatively connected to the two sets 118, 119 of pivoting links 120, 121, and lift-assisting struts (or shock absorber) 140 cooperating with each set of pivoting links 120, 121 to capture and control the load when a loaded rack 110 is pivoted between the transport configuration (see FIG. 6A) and the loading configuration (see FIG. 6F), and assist in the inverse movement of the rack 110.

The elongated base sections 112, sets 118, 119 of pivoting links 120, 121, and lift-assisting struts 140 are similar to those of the previously described embodiment and will not be described in detail again for ease of description.

Regarding the article support 130, in the embodiment shown in FIGS. 6A to 6F, the substantially horizontal sections 134 are connected by a fixed handle 136 section extending therebetween, at an outer end thereof. Hence, the distance between the brackets 135 is not adjustable. It will however be understood that the article support 130 is otherwise similar to the article support of the previously described embodiment and moves similarly and will therefore not be described in greater detail again for ease of description.

Once again, to allow the substantially resistance free angular range of motion to the rack 110, during a predetermined pivoting segment performed adjacent to the transport configuration, the proximal end 142 of each lift-assisting strut 140 is pivotally connected to a pivoting arm (or link) 150 pivotable relative to the corresponding elongated base section 112, therefore allowing the proximal end 142 of each lift-assisting strut 140 to move angularly relative to the corresponding elongated base section 112, substantially without resistance, during a predetermined angular distance. Again, the pivoting arm (or link) 150 is similar to the one described in the previous embodiment and moves similarly and will therefore not be described in detail again for ease of description.

In the embodiment shown in FIGS. 6A to 6F, the lift-assisted rack 110 further includes movement dampening pads 172 operating as a final phase movement dampener 170 configured to provide greater resistance to pivoting of the lift-assisted rack 110, during the final phase of the transition towards the loading configuration (i.e. during a short angular movement of the pivoting links 120, 121 before the loading configuration is reached). The movement dampening pads 172 therefore provide further resistance to the pivoting movement of the pivoting links 120, 121 during the final phase of the transition towards the loading configuration to provide a smooth transition to the loading configuration, substantially without jerk. In other words, they minimize a final jerk generated as the rack reaches the loading configuration and the pivoting links 120, 121 suddenly stop pivoting (e.g. as a result of one link 121 of each set of pivoting links 120, 121 engaging the engagement surface 112a of the corresponding elongated base section 112).

In the embodiment shown, the movement dampening pads 172 are each positioned to gradually engage (or gradually be compressed by) at least one link 121 of a corresponding set of pivoting links 120, 121 during the final phase of the transition towards the loading configuration and therefore provide gradually increasing resistance to the pivoting thereof (in addition to the resistance provided by the lift-assisting strut 140). The movement dampening pads 172 are specifically placed close to the proximal end 122 of the set of pivoting links 120, 121, therefore having an increasing length thereof being engaged by the link 121 of the corresponding set of pivoting links 120, 121 when the pivotal movement thereof is such that the lift-assisted rack 110 is moving close to the loading configuration. In the embodiment shown, the movement dampening pads 172 are positioned inside the anchors 114 and line a surface of each corresponding elongated base section 112. The movement dampening pads 172 are directly adjacent to the link 121 of the corresponding set of pivoting links 120, 121 engageable to the engagement surface 112a of a corresponding elongated base section 112, at the proximal end 122 thereof. For example and without being limitative, in an embodiment, the dampening pads 172 can be made of a closed-cell foam resin such as Croslite™.

One skilled in the art will understand that, in alternative embodiments (not shown), the final phase movement dampener 170 could be embodied by a component different than the above-described movement dampening pads 172 positioned to gradually engage at least one link 121 of a corresponding set of pivoting links 120, 121 (or the linear damper 71 of the embodiment described in reference to FIGS. 1 to 2G). For example and without being limitative, the final phase movement dampener 170 could include a spring specifically positioned and configured to be brought in tension (or compression) only during the final instant of the above-described second pivoting stage of the set of pivoting links 120, 121 (with resistance from the lift-assisting strut 140). In another alternative embodiments (not shown), the lift-assisting strut 140 could include a mechanism which provides a further resistance during the final instant of the above-described second pivoting stage of the set of pivoting links 120, 121 (with resistance from the lift-assisting strut 140).

In order to prevent undesired transition from the transport configuration to the loading configuration, in the embodiment shown, the rack 110 again includes a locking assembly 160 configured to lock the rack 110 in the transport configuration. In the embodiment shown, the locking assembly 160 again includes locking levers 162. However, in the embodiment shown, the locking levers 162 are only pivotable between a locked position (see FIG. 6A) where the levers 162 engage a section of the article support 130 and maintain the rack 110 in the transport configuration, and an unlocked position (see FIG. 2B), where the levers 162 are disengaged from the section of the article support 130 and therefore allows pivoting of the rack 110 from the transport configuration to the loading configuration.

Figure 6B:
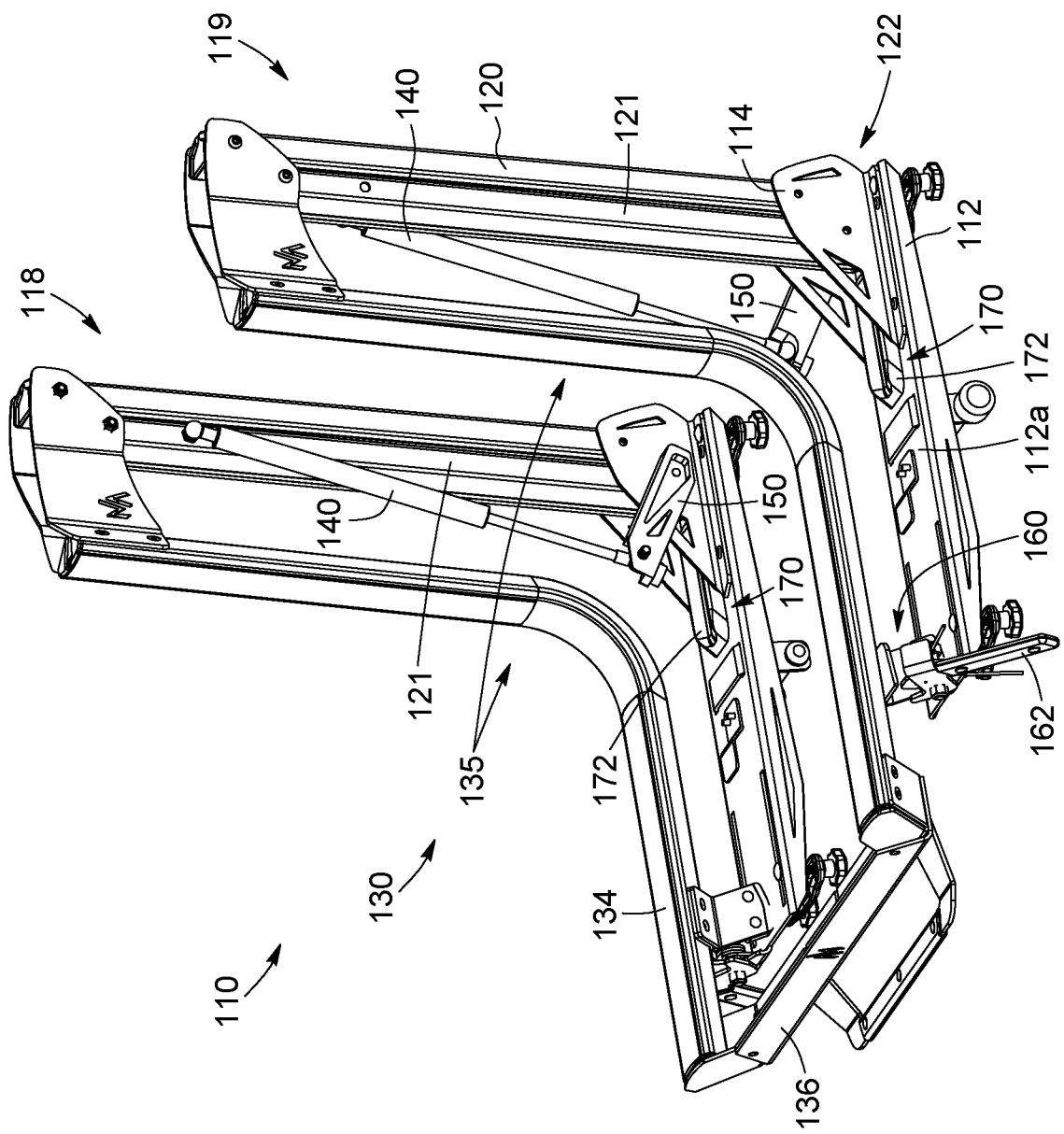
Figure 6C:
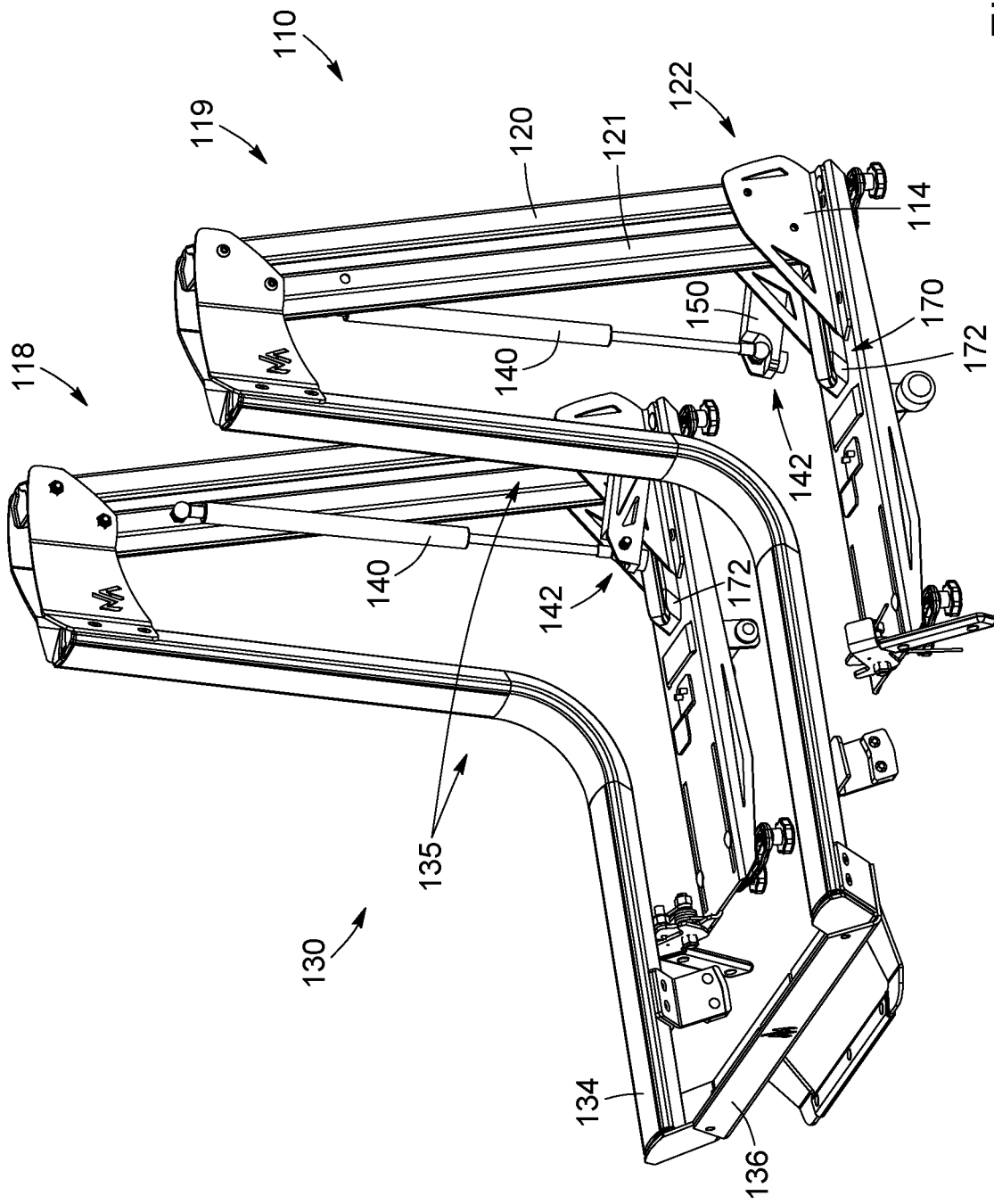
Figure 6D:
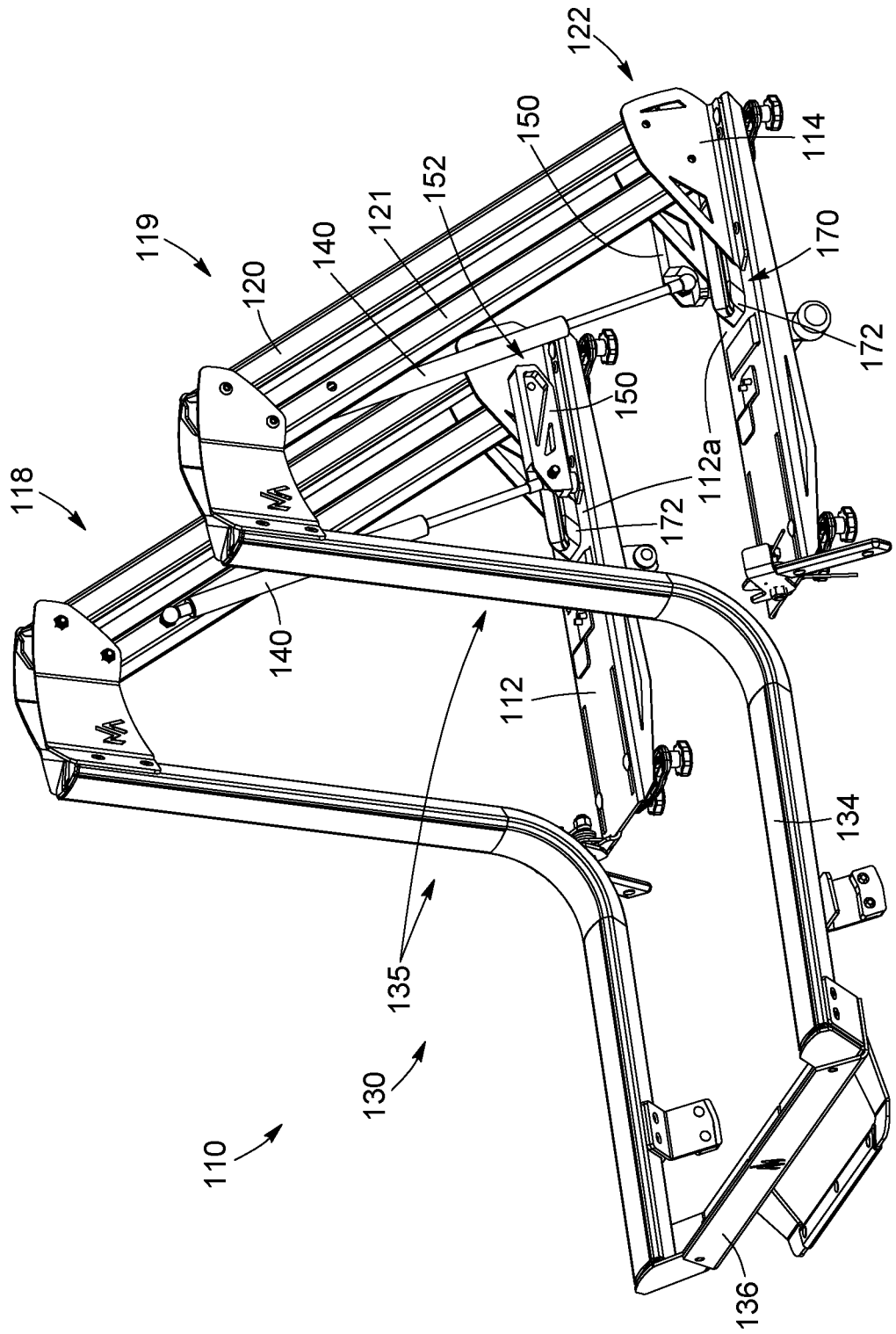
Figure 6E:
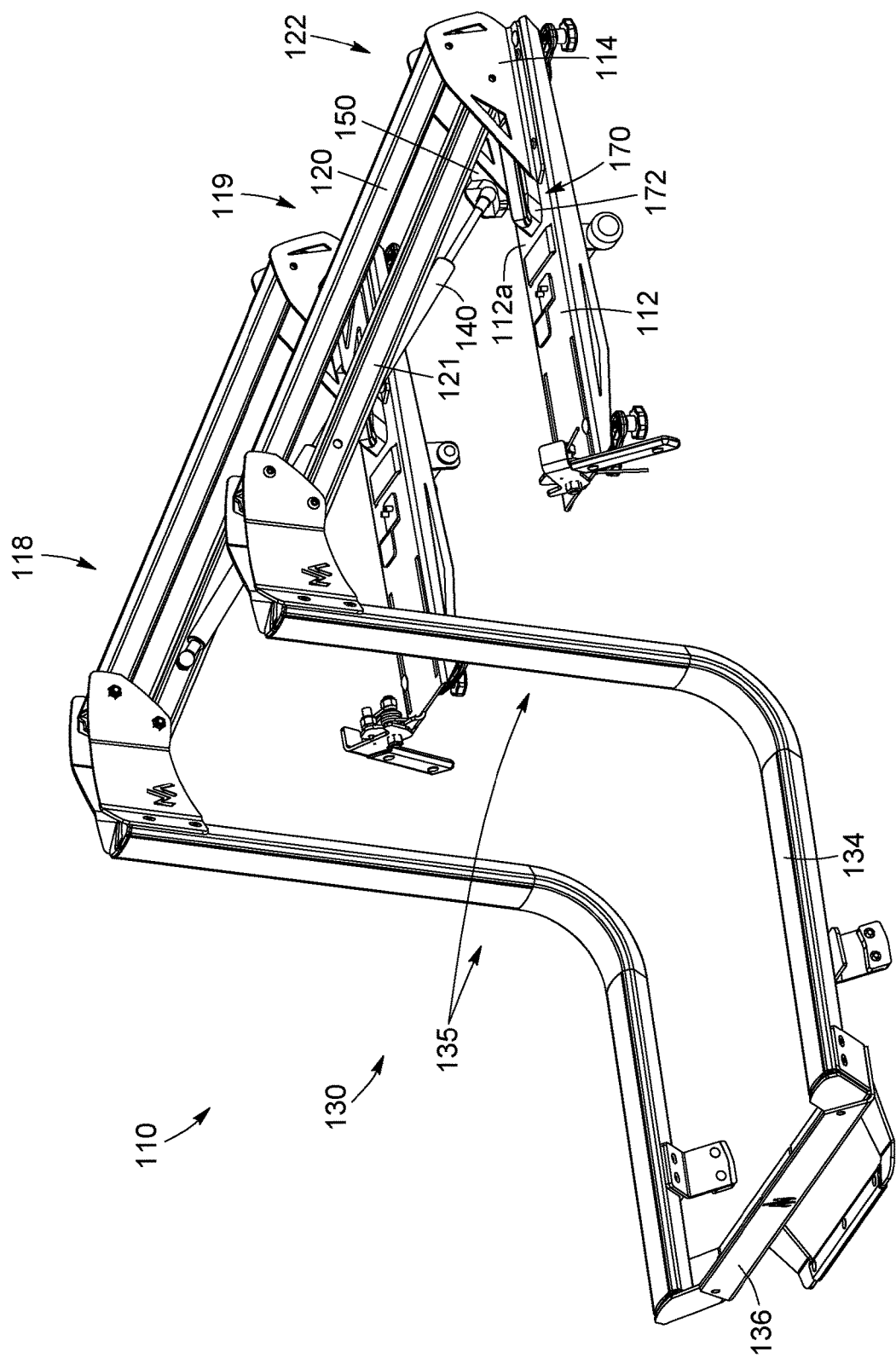

In view of the above, referring to FIGS. 6A to 6F, in operation, when the lift-assisted rack 110 is pivoted between the transport configuration (shown in FIG. 6A) and the loading configuration (shown in FIG. 6F) and vice-versa, the pivoting occurs in substantially three stages. An initial stage substantially without resistance/assistance (as shown in FIG. 6C), a subsequent stage with resistance/assistance from the lift-assisting strut 140 (as shown in FIG. 6E), and a final stage with resistance/assistance from the lift-assisting strut 140 and the movement dampening pads 172 engaging the pivoting links 121 (leading to the loading configuration shown in FIG. 6F).

In more details, FIG. 6A shows the lift-assisted rack 110 in a transport configuration used to transport article (not shown) onto the roof of a vehicle (not shown).

FIG. 6B shows the locking assembly 160 being unlocked, with the levers 162 moved to the unlocked position.

FIG. 6C shows the initial pivoting of the lift-assisted rack 110 towards the loading configuration, performed by a user grasping the handle 136 of the article support 130 and pulling the article support 130 outwardly and towards the ground. Similarly to the above described embodiment, in the initial stage of pivoting of the rack 110, the pivoting links 120, 121 are pivoted and the pivoting arms 150 also pivot, thereby moving the proximal ends 142 of the lift-assisting struts 140 towards the elongated base sections 112. Hence, during this stage, the lift-assisted rack 110 pivots, without substantial resistance/assistance from the lift-assisting strut 140.

FIG. 6D shows the stage where the pivoting arms 150 reach the end of their angular range and engage the engagement surface 112a of the elongated base sections 112.

FIG. 6E shows the subsequent pivoting stage of the lift-assisted rack 110 towards the loading configuration, again performed by a user grasping the handle 136 of the article support 130 and pulling the article support 130 outwardly and towards the ground. During this subsequent pivoting stage, the position of the proximal ends 142 of the lift-assisting struts 140 relative to the elongated base sections 112 remains unchanged (as a result of the pivoting arms 150 engaging the engagement surface 112a of the elongated base sections 112). Hence, further pivoting of the pivoting links 120, 121 causes the lift-assisting strut 140 to be compressed, thereby imparting resistance to the pivoting of the pivoting links 120, 121 by the lift-assisting strut 140. The resistance to the pivoting of the pivoting links 120, 121 by the lift-assisting strut 140 at this stage is advantageous, as it helps control the downward movement of the article support 130 (especially when it is loaded with a heavy article such as a watercraft or the like) to prevent a downward movement that is too quick or that requires substantial force from the user to support the article support 130 in its downward motion.

Figure 6F:
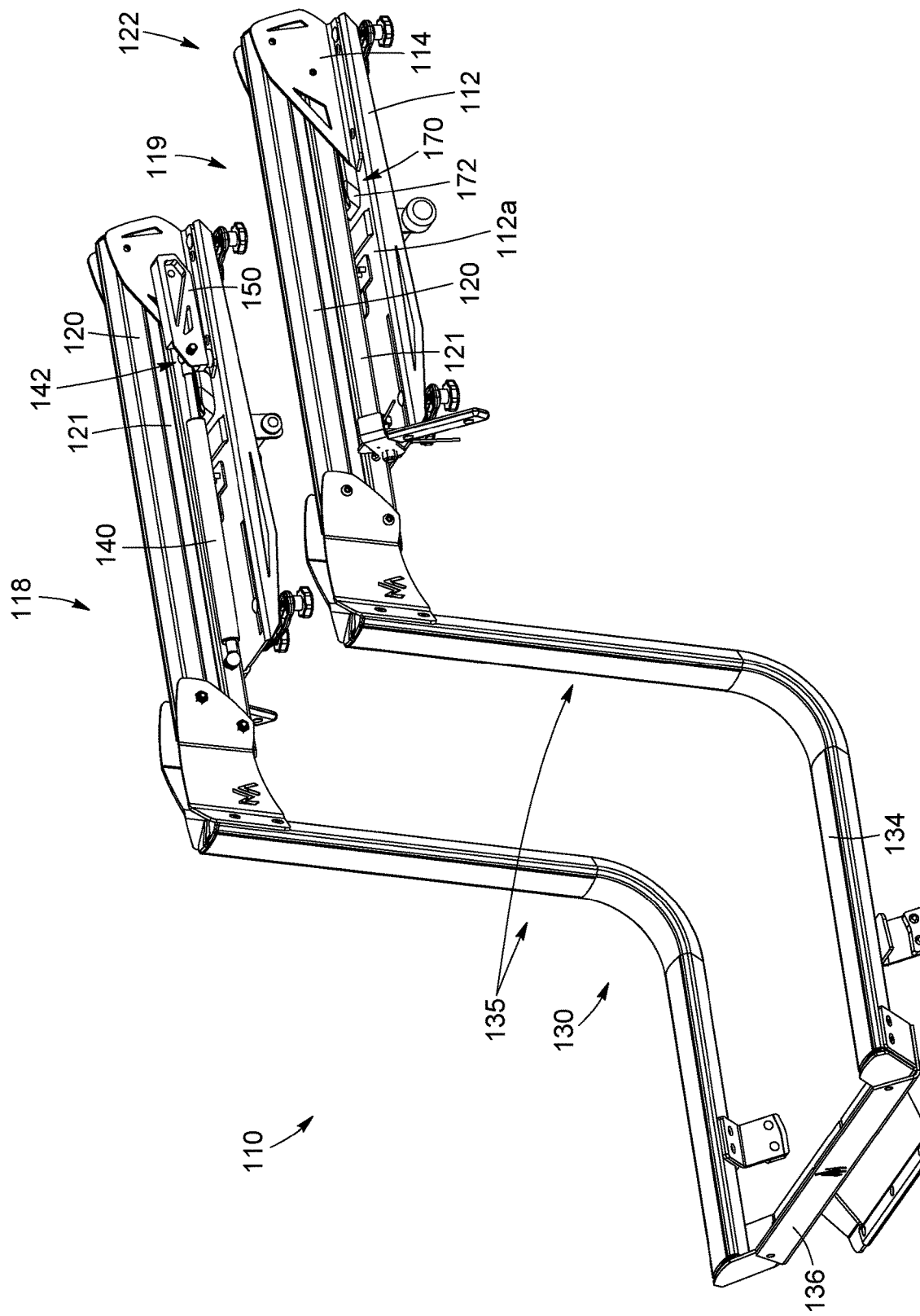

FIG. 6F shows the lift-assisted rack 110 having reached the loading configuration, with a link 121 of each set of pivoting links 120, 121 engaging (or abutted onto) the engagement surface 112a of the corresponding elongated base section 112, with the article support 130 extending in a cantilevered position, along a side of the vehicle (not shown). As previously mentioned, during the final phase of the transition towards the loading configuration (i.e. before the link 121 of each set of pivoting links 120, 121 engage (or abut onto) the engagement surface 112a of the corresponding elongated base section 112), the links 121 gradually compress the movement dampening pads 172 and therefore provide gradually increasing resistance to the pivoting thereof (in addition to the resistance provided by the lift-assisting strut 140) to provide a smooth transition towards the loading configuration.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A lift-assisted rack mountable to a roof rack of a vehicle and pivotable between a transport configuration and a loading configuration, the lift-assisted rack comprising:
   at least one base section having an engagement surface and being securable to a section of the roof rack of the vehicle;
   at least one pivoting link pivotable relative to a corresponding one of the at least one base section and extending between a link proximal end and a link distal end, the at least one pivoting link being pivotally connected to the corresponding one of the at least one base section at the link proximal end, to pivot about a static pivot point relative to the corresponding one of the at least one base section during pivoting of the at least one pivoting link;
   an article support pivotally connected to the at least one pivoting link, at the link distal end thereof;
   at least one pivoting arm pivotable relative to a corresponding one of the at least one base section and extending between an arm proximal end and an arm distal end, the at least one pivoting arm being operatively connected to the corresponding one of the at least one base section at the arm proximal end and being pivotable of a predetermined angular distance, the at least one pivoting arm being engageable to the engagement surface of the corresponding one of the at least one base section upon a predetermined angular displacement corresponding to the angular distance of which the at least one pivoting arm is pivotable; and at least one lift-assisting strut extending between a strut proximal end and a strut distal end, each one of the at least one lift-assisting strut being pivotally connected to a corresponding one of the at least one pivoting links at the strut distal end and being pivotally connected to the arm distal end of a corresponding one of the at least one pivoting arm, at the strut proximal end.

2. The lift-assisted rack of claim 1, wherein the at least one pivoting link comprises at least one set of pivoting links pivotable relative to the corresponding one of the at least one base section and extending between the link proximal end and the link distal end, each one of the pivoting links being pivotally connected to the corresponding one of the at least one base section at the link proximal end to pivot about a respective static pivot point relative to the corresponding one of the at least one base section during pivoting of the at least one set of pivoting links.

3. The lift-assisted rack of claim 1, wherein the predetermined angular distance of which the at least one pivoting arm is pivotable ranges between 90 degrees and 25 degrees.

4. The lift-assisted rack of claim 1, wherein the predetermined angular distance of which the at least one pivoting arm is pivotable ranges between 55 degrees and 35 degrees.

5. The lift-assisted rack of claim 1, wherein the article support comprises at least one substantially horizontal section and wherein the at least one pivoting link and the article support are configured to maintain the at least one substantially horizontal section of the article support in a substantially horizontal orientation during the transition between the transport configuration and the loading configuration.

6. The lift-assisted rack of claim 5, wherein the article support comprises at least two substantially horizontal sections spaced apart from one another and wherein a handle is adjustably securable to an outer end of the at least two substantially horizontal sections.

7. The lift-assisted rack of claim 1, further comprising a final phase movement dampener configured to provide further resistance to the pivoting of the at least one pivoting link, during a final phase of an angular movement of the at least one pivoting link where the lift-assisted rack is proximate to the loading configuration, the final phase of the angular movement of the at least one pivoting link comprising an angular displacement of the at least one pivoting link ranging between 20 degrees and 60 degrees before the lift-assisted rack reaches the loading configuration.

8. The lift-assisted rack of claim 7, wherein the final phase movement dampener comprises one of at least one linear damper having an end mounted to a corresponding one of the at least one pivoting link and at least one dampening pad lining a section of a corresponding one of the at least one base section and being positioned directly adjacent to a corresponding one of the at least one pivoting link, at the link proximal end thereof.

9. The lift-assisted rack of claim 1, wherein each one of the at least one base section comprises a fixed anchor, the link proximal end of a corresponding one of the at least one pivoting link being pivotally connected to the fixed anchor and the arm proximal end of each one of the at least one pivoting arm being pivotally connected to the fixed anchor of a corresponding one of the at least one base section.

10. The lift-assisted rack of claim 1, further comprising a locking mechanism having at least one locking lever movable between a locked position where the lift-assisted rack is locked in the transport configuration and an unlocked position where the lift-assisted rack is pivotable towards the loading configuration.

11. A lift-assisted rack mountable to a roof of a vehicle and pivotable between a transport configuration and a loading configuration, the lift-assisted rack comprising:

a fixed base mountable to the roof of the vehicle;

a set of pivoting links extending between a link proximal end and a link distal end, the set of pivoting links being pivotally connected to the fixed base at the link proximal end thereof;

an article support pivotally connected to the set of pivoting links, at the link distal end thereof;

a pivoting arm extending between an arm proximal end and an arm distal end, the pivoting arm being pivotally connected to the fixed base at the arm proximal end and being pivotable of a predetermined angular distance;

a lift-assisting strut extending between a strut proximal end and a strut distal end, the lift-assisting strut being pivotally connected to one link of the set of pivoting links at the strut distal end and being pivotally connected to the arm distal end of the pivoting arm, at the strut proximal end thereof.

12. The lift-assisted rack of claim 11, wherein the fixed base comprises an elongated base section having an engagement surface and being securable to a section of a roof rack of the vehicle.

13. The lift-assisted rack of claim 12, wherein the elongated base section comprises a fixed anchor fixedly mounted thereto, the link proximal end of the set of pivoting links and the arm proximal end of the pivoting arm each being pivotally connected to the fixed anchor.

14. The lift-assisted rack of claim 12, wherein the pivoting arm is engageable to the engagement surface of the elongated base section upon a predetermined angular displacement corresponding to the angular distance of which the pivoting arm is pivotable.

15. The lift-assisted rack of claim 11, wherein the predetermined angular distance of which the pivoting arm is pivotable ranges between 90 degrees and 25 degrees.

16. The lift-assisted rack of claim 11, wherein the predetermined angular distance of which the pivoting arm is pivotable ranges between 55 degrees and 35 degrees.

17. The lift-assisted rack of claim 11, wherein the article support comprises a substantially horizontal section and wherein the set of pivoting links and the article support are configured to maintain the substantially horizontal section of the article support in a substantially horizontal orientation during the transition between the transport configuration and the loading configuration.

18. The lift-assisted rack of claim 17, wherein the article support comprises at least two substantially horizontal sections spaced apart from one another and wherein a handle is adjustably securable to an outer end of the at least two substantially horizontal sections.

19. The lift-assisted rack of claim 11, further comprising a final phase movement dampener configured to provide further resistance to the pivoting of the set of pivoting links, during a final phase of an angular movement of the pivoting links where the lift-assisted rack is proximate to the loading configuration, the final phase of the angular movement of the set of pivoting links comprising an angular displacement of the pivoting links ranging between 60 degrees and 20 degrees before the lift-assisted rack reaches the loading configuration.

20. The lift-assisted rack of claim 19, wherein the final phase movement dampener comprises one of a linear damper having an end mounted to one of the links of the set of pivoting links and at least one dampening pad lining a section of the fixed base and being positioned directly adjacent to the set of pivoting links, at the link proximal end thereof.

21. The lift-assisted rack of claim 11, further comprising a locking mechanism having at least one locking lever movable from a locked position where the lift-assisted rack is locked in the transport configuration and an unlocked position where the lift-assisted rack is pivotable towards the loading configuration.

22. A lift-assisted rack mountable to a roof rack of a vehicle and pivotable between a transport configuration and a loading configuration, the lift-assisted rack comprising:
- at least one base section having an engagement surface and being securable to a section of the roof rack of the vehicle;
- at least one pivoting link pivotable relative to a corresponding one of the at least one base section and extending between a link proximal end and a link distal end, the at least one pivoting link being pivotally connected to the corresponding one of the at least one base section at the link proximal end, to pivot about a static pivot point relative to the corresponding one of the at least one base section during pivoting of the at least one pivoting link;
- an article support pivotally connected to the at least one pivoting link, at the link distal end thereof;
- at least one pivoting arm pivotable relative to a corresponding one of the at least one base section and extending between an arm proximal end and an arm distal end, the at least one pivoting arm being operatively connected to the corresponding one of the at least one base section at the arm proximal end and being pivotable of a predetermined angular distance, wherein the at least one pivoting link comprises at least one set of pivoting links pivotable relative to the corresponding one of the at least one base section and extending between the link proximal end and the link distal end, each one of the pivoting links being pivotally connected to the corresponding one of the at least one base section at the link proximal end to pivot about a respective static pivot point relative to the corresponding one of the at least one base section during pivoting of the at least one set of pivoting links; and
- at least one lift-assisting strut extending between a strut proximal end and a strut distal end, each one of the at least one lift-assisting strut being pivotally connected to a corresponding one of the at least one pivoting links at the strut distal end and being pivotally connected to the arm distal end of a corresponding one of the at least one pivoting arm, at the strut proximal end.

\* \* \* \* \*